United States Patent
Banerjee et al.

(10) Patent No.: US 9,229,140 B2
(45) Date of Patent: *Jan. 5, 2016

(54) OMNIDIRECTIONAL UV-IR REFLECTOR

(75) Inventors: Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Erlanger, KY (US); Toyota Motor Corporation, Toyota (JP)

(*) Notice: Subject to any disclaimer, the term of this patent is extended or adjusted under 35 U.S.C. 154(b) by 307 days.

This patent is subject to a terminal disclaimer.

(21) Appl. No.: 13/014,398

(22) Filed: Jan. 26, 2011

(65) Prior Publication Data

US 2011/0134515 A1    Jun. 9, 2011

Related U.S. Application Data

(63) Continuation-in-part of application No. 12/626,861, filed on Jan. 13, 2010, now Pat. No. 8,593,728, which is a continuation-in-part of application No. 12/389,256, filed on Feb. 19, 2009, now Pat. No. 8,329,247, application No. 13/014,398, which is a continuation-in-part of application No. 12/793,772, filed on Jun. 4, 2010, now Pat. No. 8,736,959.

(51) Int. Cl.
 *G02B 1/00*    (2006.01)
 *G02B 5/28*    (2006.01)

(52) U.S. Cl.
 CPC .............. *G02B 5/281* (2013.01); *G02B 5/282* (2013.01); *G02B 5/283* (2013.01); *G02B 5/285* (2013.01)

(58) Field of Classification Search
 CPC .......... G02B 5/28; G02B 5/281; G02B 5/282; G02B 5/283; G02B 5/285; G02B 5/286

USPC ................ 359/584, 586, 357, 359, 361, 587; 313/112
See application file for complete search history.

(56) References Cited

U.S. PATENT DOCUMENTS 3,953,643 A    4/1976 Cheung et al.
4,556,599 A *  12/1985 Sato et al. .................... 428/216
(Continued)

FOREIGN PATENT DOCUMENTS

CN    1527100 A    9/2004
CN    1741246 A    3/2006
(Continued)

OTHER PUBLICATIONS

U.S. Appl. No. 12/389,221.
(Continued)

*Primary Examiner* — Audrey Y Chang
(74) *Attorney, Agent, or Firm* — Dinsmore & Shohl LLP

(57) ABSTRACT

The present invention provides an omnidirectional ultraviolet (UV)-infrared (IR) reflector. The omnidirectional UV-IR reflector includes a multilayer stack having at least three layers, the at least three layers having at least one first index of refraction material A1 and at least one second index of refraction layer B1. The at least one first index of refraction material layer and the at least one second index of refraction material layer can be alternately stacked on top of each other to provide the at least three layers. In addition, the at least one first index of refraction material layer and the at least one second index of refraction material layer each have a predefined thickness of $d_{A1}$ and $d_{B1}$, respectively, with the thickness $d_{A1}$ not being generally equal to the $d_{B1}$ thickness such that the multilayer stack has a non-periodic layered structure.

9 Claims, 14 Drawing Sheets

(56) References Cited

U.S. PATENT DOCUMENTS

| | | | |
|---|---|---|---|
| 4,705,839 A | 11/1987 | Martin | |
| 4,753,829 A | 6/1988 | Panush | |
| 4,756,602 A | 7/1988 | Southwell et al. | |
| 4,896,928 A | 1/1990 | Perilloux et al. | |
| RE33,729 E * | 10/1991 | Perilloux | 359/359 |
| 5,437,931 A | 8/1995 | Tsai et al. | |
| 5,472,798 A | 12/1995 | Kumazawa et al. | |
| 5,569,332 A | 10/1996 | Glatfelter et al. | |
| 5,982,078 A * | 11/1999 | Krisl et al. | 313/112 |
| 6,156,115 A | 12/2000 | Pfaff et al. | |
| 6,215,592 B1 | 4/2001 | Pelekhaty | |
| 6,242,056 B1 | 6/2001 | Spencer et al. | |
| 6,249,378 B1 | 6/2001 | Shimamura et al. | |
| 6,331,914 B1 | 12/2001 | Wood, II et al. | |
| 6,399,228 B1 | 6/2002 | Simpson | |
| 6,433,931 B1 | 8/2002 | Fink et al. | |
| 6,565,770 B1 | 5/2003 | Mayer et al. | |
| 6,596,070 B1 | 7/2003 | Schmidt et al. | |
| 6,844,976 B1 * | 1/2005 | Firon et al. | 359/586 |
| 6,873,393 B2 | 3/2005 | Ma | |
| 6,903,873 B1 | 6/2005 | Joannopoulos et al. | |
| 6,997,981 B1 | 2/2006 | Coombs et al. | |
| 7,052,762 B2 | 5/2006 | Hebrink et al. | |
| 7,064,897 B2 | 6/2006 | Hebrink et al. | |
| 7,106,516 B2 | 9/2006 | Lotz et al. | |
| 7,141,297 B2 | 11/2006 | Condo et al. | |
| 7,215,473 B2 | 5/2007 | Fleming | |
| 7,326,967 B2 | 2/2008 | Hsieh et al. | |
| 7,329,967 B2 | 2/2008 | Nozawa et al. | |
| 7,352,118 B2 | 4/2008 | Chowdhury et al. | |
| 7,452,597 B2 | 11/2008 | Bujard | |
| 7,745,312 B2 | 6/2010 | Herner et al. | |
| 7,847,342 B2 | 12/2010 | Fukuzumi et al. | |
| 7,863,672 B2 | 1/2011 | Jin et al. | |
| 7,903,339 B2 | 3/2011 | Banerjee et al. | |
| 7,929,730 B2 | 4/2011 | Huang et al. | |
| 8,013,383 B2 | 9/2011 | Kidoh et al. | |
| 8,313,798 B2 | 11/2012 | Nogueira et al. | |
| 8,323,391 B2 | 12/2012 | Banerjee et al. | |
| 8,329,247 B2 | 12/2012 | Banerjee et al. | |
| 8,350,314 B2 | 1/2013 | Fukuzumi et al. | |
| 8,446,666 B2 | 5/2013 | Kurt et al. | |
| 8,593,728 B2 | 11/2013 | Banerjee et al. | |
| 2002/0030882 A1 | 3/2002 | Vitt et al. | |
| 2003/0002157 A1 | 1/2003 | Someno | |
| 2003/0059549 A1 | 3/2003 | Morrow et al. | |
| 2004/0156984 A1 | 8/2004 | Vitt et al. | |
| 2004/0252509 A1 | 12/2004 | Lin | |
| 2005/0132929 A1 | 6/2005 | Raksha et al. | |
| 2005/0152417 A1 | 7/2005 | Lin | |
| 2005/0264874 A1 | 12/2005 | Lin | |
| 2006/0006402 A1 | 1/2006 | Hsieh et al. | |
| 2006/0081858 A1 | 4/2006 | Lin et al. | |
| 2006/0145172 A1 | 7/2006 | Su et al. | |
| 2009/0046368 A1 | 2/2009 | Banerjee et al. | |
| 2009/0153953 A1 | 6/2009 | Banerjee et al. | |
| 2009/0161220 A1 | 6/2009 | Banerjee et al. | |
| 2010/0064938 A1 | 3/2010 | Voit et al. | |
| 2010/0208338 A1 * | 8/2010 | Banerjee et al. | 359/359 |
| 2010/0209593 A1 | 8/2010 | Banerjee et al. | |
| 2011/0091658 A1 | 4/2011 | Banerjee et al. | |
| 2011/0113984 A1 | 5/2011 | Fuller, Jr. et al. | |
| 2011/0128616 A1 | 6/2011 | Banerjee et al. | |
| 2011/0134515 A1 | 6/2011 | Banerjee et al. | |
| 2011/0299154 A1 | 12/2011 | Grayson et al. | |
| 2012/0307369 A1 | 12/2012 | Banerjee et al. | |
| 2013/0148221 A1 | 6/2013 | Banerjee et al. | |
| 2013/0265668 A1 | 10/2013 | Banerjee et al. | |
| 2014/0111861 A1 | 4/2014 | Banerjee et al. | |

FOREIGN PATENT DOCUMENTS

| | | |
|---|---|---|
| JP | 07034324 | 2/1995 |
| JP | 2006506518 A | 2/2006 |
| WO | WO-99/42892 A1 | 8/1999 |
| WO | WO-00/22466 A1 | 4/2000 |

OTHER PUBLICATIONS

Sajeev John et al., Photonic Band Gap Materials; A Semiconductor for Light; Department of Physics, University of Toronto, p. 1-23.

Kate Kaminska et al., Birefringent Omnidirectional Reflector; Applied Optics; vol. 43, No. 7; Mar. 2004.

M. Deopura et al., Dielectric Omnidirectional Visible Reflector; Optical Society of America; vol. 26, No. 15; Department of Material Science and Engineering, Massachusetts Institute of Technology; pp. 1197-1199.

Distributed Bragg Reflector; en.wikipedia.org/wiki/Bragg_reflector.

Photonic Crystal; en.wikipedia.org/wiki/Photonic_crystals.

Optical Coating Design Algorithm Based On The Equivalent Layers Theory; Alexander V. Tikhonravov et al; Applied Optics; vol. 45, No. 7; Mar. 2006.

Tikhonravov, et al., "Application Of The Needle Optimization Technique To The Design Of Optical Coatings", Applied Optics, Optical Society of America, 1996, pp. 5493-5508, vol. 35, No. 28.

* cited by examiner

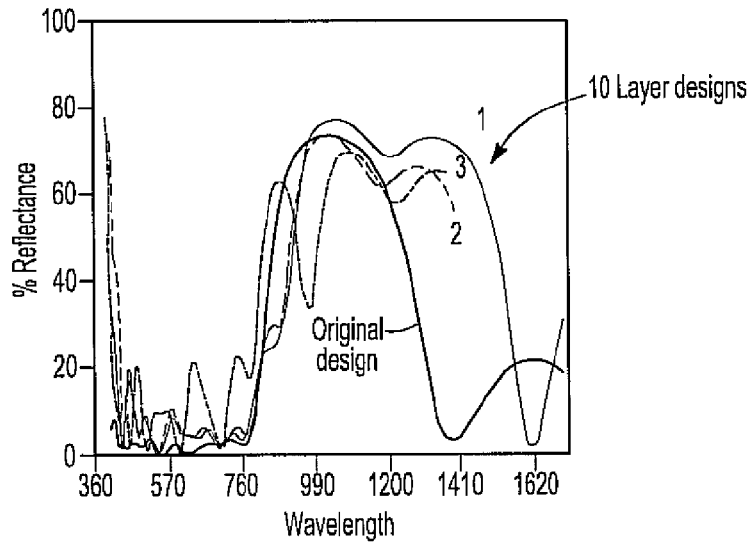
*Fig-10*
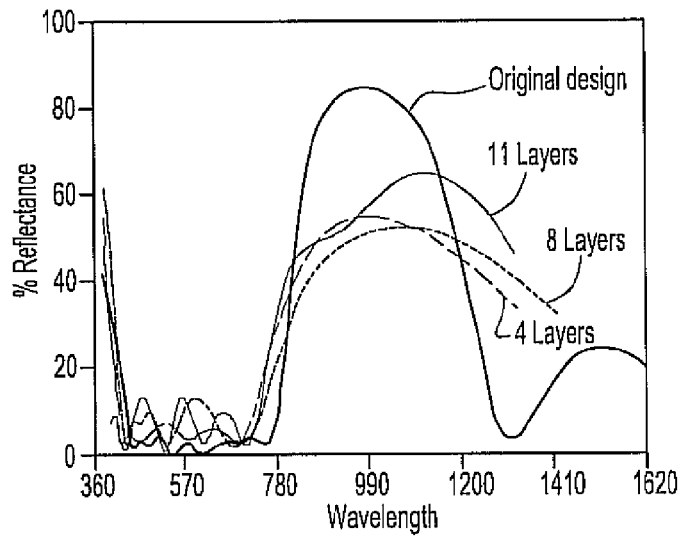
*Fig-11*
| Index of Refraction = n1 | Thickness ( nm ) = d1 |
|---|---|
| Index of Refraction = n2 | Thickness ( nm ) = d2 |
| Index of Refraction = n1 | Thickness ( nm ) = d1 |
⟺
Index of Refraction = N    Phase Thickness = $\phi$
$\phi$ = function ($\lambda$, D)
*Fig-13*

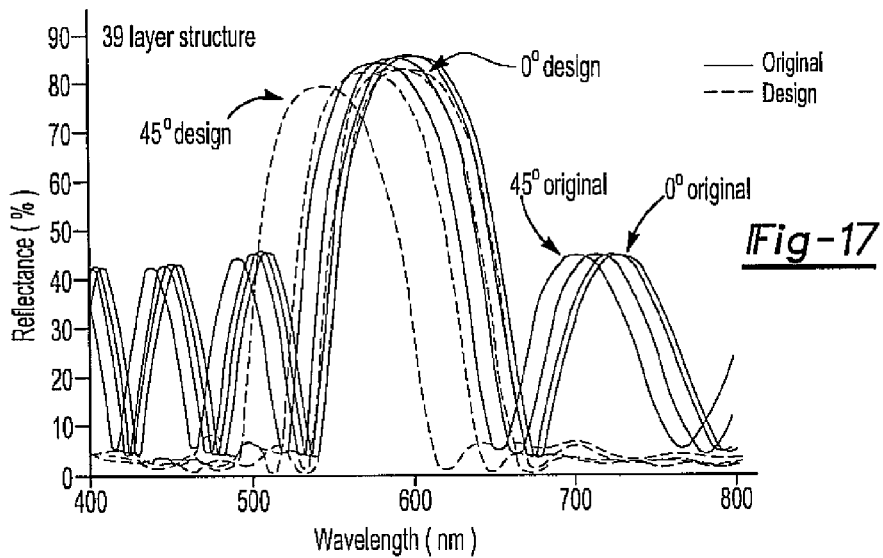
*Fig-16*
*Fig-17*
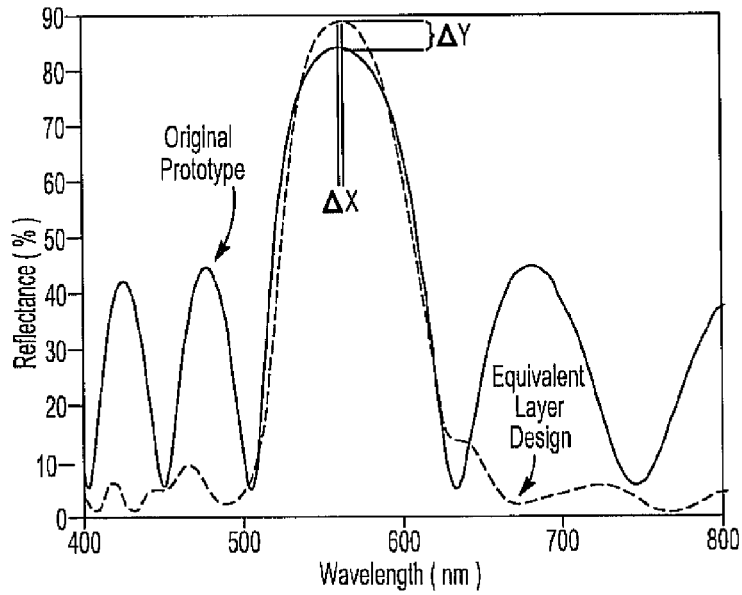
*Fig-18*

OMNIDIRECTIONAL UV-IR REFLECTOR

CROSS-REFERENCE TO RELATED APPLICATIONS

This application is a continuation-in-part of U.S. patent application Ser. No. 12/793,772 filed Jun. 4, 2010, entitled "Omnidirectional Reflector" which is a continuation-in-part of U.S. patent application Ser. No. 11/837,529 filed Aug. 12, 2007, entitled "Narrow Band Omnidirectional Reflectors and Their Use as Structural Colors." This application is also a continuation-in-part of U.S. patent application Ser. No. 12/686,861 filed Jan. 13, 2010, entitled "Multilayer Photonic Structures" which is a continuation-in-part of U.S. patent application Ser. No. 12/389,256 filed Feb. 19, 2009, entitled "Methods for Producing Omnidirectional Multilayer Photonic Structures", all of which are incorporated herein in their entirety by reference.

FIELD OF THE INVENTION

The present invention is related to an omnidirectional ultraviolet-infrared reflector and, in particular, to an omnidirectional ultraviolet-infrared reflector made from a multilayer stack having a non-periodic layered structure.

BACKGROUND OF THE INVENTION

Sunlight comprises a range of wavelengths in the electromagnetic radiation spectrum including ultraviolet (UV), visible, and infrared (IR) radiation with the term "light" typically used in reference to the visible spectrum. The color of a pigment associated with a particular object is determined by the wavelengths of light reflected by the pigment and observed by the human eye. For example, sunlight or white light comprises a roughly equal mixture of wavelengths in the visible spectrum. When white light is incident on a pigment, some wavelengths of the white light are absorbed while others are reflected with the reflected wavelengths determining the color of the pigment. For most, if not all, heretofore pigments, reflectivity is strongly dependent on the angle of the light incident on the object. Accordingly, the pigment may reflect different wavelengths of light for different angles of incidence while absorbing others and the pigment exhibits a color shift for different angles of incident light and/or for different angles of viewing the pigment.

Similar effects can be found with UV and IR radiation. Specifically, for different angles of incidence, a pigment may reflect certain wavelengths of UV and/or IR radiation while absorbing other wavelengths. It is known that such absorption of UV and/or IR radiation can have undesirable effects. For example, when UV radiation is absorbed by a polymeric material, photo-degradation of the polymer, i.e. breaking of chemical bonds within the material, can cause cracking, chalking, color change and/or the loss of physical properties of the polymeric material. In addition, near IR radiation from the sun (780 nm-2100 nm) carries 53% of total solar energy, which, when absorbed, can cause heat to build up on a surface of an object and result in undesirable thermal conditions. For example, the efficiency and/or performance of HVAC systems within automobiles, buildings and other structures can be reduced when a surface does not reflect near IR radiation and heating occurs. Therefore, an improved UV and/or IR reflector that can reflect UV and/or IR radiation irrespective of the electromagnetic radiation incident angle would be desirable.

SUMMARY OF THE INVENTION

The present invention provides an omnidirectional ultraviolet (UV)-infrared (IR) reflector. The omnidirectional UV-IR reflector includes a multilayer stack having at least three layers, the at least three layers having at least one first index of refraction material A1 and at least one second index of refraction layer B1. The at least one first index of refraction material layer and the at least one second index of refraction material layer can be alternately stacked on top of each other to provide the at least three layers. In addition, the at least one first index of refraction material layer and the at least one second index of refraction material layer each have a predefined thickness of $d_{A1}$ and $d_{B1}$, respectively, with the thickness $d_{A1}$ not being generally equal to the $d_{B1}$ thickness such that the multilayer stack has a non-periodic layered structure.

The multilayer stack, at incident angles between 0 to 45 degrees, has a first omnidirectional reflection band for electromagnetic radiation having a wavelength of less than 400 nanometers, a second omnidirectional reflection band for electromagnetic radiation having a wavelength of greater than 800 nanometers, and an omnidirectional transparency band between the first omnidirectional reflection band and the second omnidirectional reflection band. The multilayer stack can also have a transparency of at least 20% for a wavelength of about 850 nanometers for incident angles between 0 to 45 degrees.

The first omnidirectional reflection band and the second omnidirectional reflection band can reflect at least 50% of electromagnetic radiation having a wavelength of less than 400 nanometers and at least 50% of electromagnetic radiation having a wavelength of greater than 800 nanometers. In some instances, the first and second omnidirectional reflection bands reflect at least 75% of the electromagnetic radiation having a wavelength of less than about 400 nanometers and at least 75% of the electromagnetic radiation having a wavelength of greater than 800 nanometers, respectively.

The omnidirectional transparency band can be greater than 80% transparent, and in some instances greater than 90% transparent, for electromagnetic radiation having a wavelength between 400 to 800 nanometers. The multilayer stack can also reflect greater than 50%, and in some instances greater than 75%, of IR electromagnetic radiation having wavelengths between 800 and 1400 nanometers.

In some instances, the multilayer stack can include at least one third index of refraction material layer C1 with the at least one first index of refraction material layer A1, the at least one second index of refraction layer B1, and the at least one third index of refraction material layer C1 alternately stacked on top of each other such that the multilayer stack has the at least three layers and is a non-periodic layered structure.

A process for omnidirectionally reflecting UV and IR electromagnetic radiation is also provided. The process includes providing a multilayer stack as described above and providing a source of broadband electromagnetic radiation. The multilayer stack is exposed to the source of broadband electromagnetic radiation and reflects at least 50% of radiation having a wavelength of less than 400 nanometers and at least 50% of radiation having a wavelength of greater than 800 nanometers. In addition, the process includes passing at least 20% of the electromagnetic radiation having a wavelength of about 850 nanometers through the multilayer stack for incident angles between 0 to 45 degrees.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 10 graphically illustrates reflectance versus wavelength for an original nine-layer design and three ten-layer designs of multilayer photonic structures according to one or more embodiments of the present invention;

FIG. 11 graphically illustrates reflectance versus wavelength for an original nine-layer design, a four-layer design, an eight-layer design, and an eleven-layer design of multilayer photonic structures according to one or more embodiments of the present invention;

FIG. 13 illustrates a three-layer structure made from two different materials and a corresponding single equivalent layer;

FIG. 16 illustrates an improved design concept of equivalent layer approximations;

FIG. 17 is a graphical representation of reflectance versus wavelength for a 39-layer structure that is equivalent to a 13-layer structure;

FIG. 18 is a graphical representation of the difference in maximum wavelength ($\Delta X$) and maximum reflectance ($\Delta Y$) between the 39-layer structure and the 13-layer structure;

DETAILED DESCRIPTION OF THE INVENTION

Figure 1:
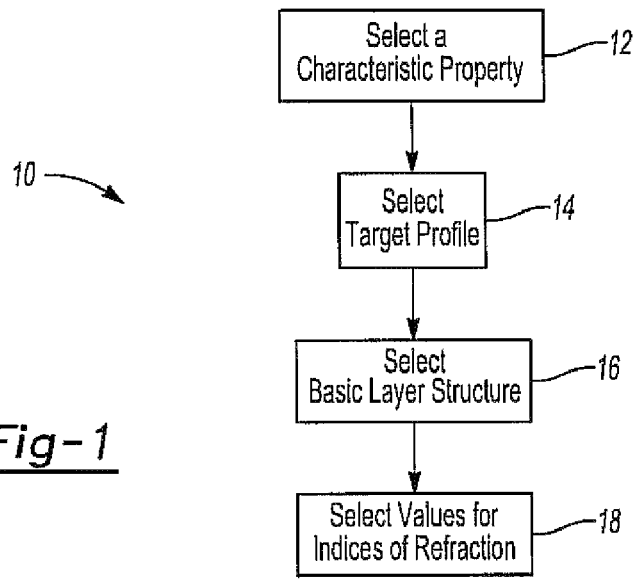
FIG. 1 illustrates a flow diagram of preliminary steps for producing a multilayer stack according to an embodiment of the present invention.

The present invention provides an omnidirectional ultraviolet (UV)-infrared (IR) reflector that can reflect electromagnetic radiation having a wavelength of less than 400 nanometers and electromagnetic radiation having a wavelength of greater than 800 nanometers. As such, the present invention has utility as a reflector for reflecting UV radiation and/or IR radiation.

The omnidirectional UV-IR reflector includes a multilayer stack that has at least three layers and exhibits a non-periodic layered structure. In particular, the at least three layers can include at least one first index of refraction material layer A1 and at least one second index of refraction layer B1. The at least one first index of refraction material layer and the at least one second index of refraction material layer are alternately stacked on top of each other and the thickness of each layer is generally different than the thickness of the other layers in the multilayer stack.

The omnidirectional UV-IR reflector can reflect at least 50% of electromagnetic radiation having a wavelength of less than about 400 nanometers and at least 50% of electromagnetic radiation having a wavelength of greater than 800 nanometers. In some instances, the omnidirectional UV-IR reflector reflects at least 75% of electromagnetic radiation having a wavelength of less than about 400 nanometers and at least 75% of electromagnetic radiation having a wavelength of greater than 800 nanometers. In addition, the reflector can be transparent to at least 20% of radiation having a wavelength of about 850 nanometers and at least 80% of radiation having a wavelength between 400 to 800 nanometers to pass therethrough.

In one embodiment, a multilayer stack in the form of a multilayer photonic structure includes a plurality of coating layers of first or low index dielectric material having an index of refraction $n_L$ and a plurality of coating layers of second or high index dielectric material having an index of refraction $n_H$. The coating layers of high index dielectric material and the coating layers of low index dielectric material may be alternately arranged. In some instances a first coating layer and a last coating layer of the multilayer photonic structure can be the low index material, however this is not required. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. In addition, the index-thicknesses of coating layers of low index dielectric material may be different than the index-thicknesses of coating layers of high index dielectric material.

The multilayer photonic structure can have a first high reflectivity bandwidth, a second high reflectivity bandwidth and a low reflectivity bandwidth for electromagnetic radiation incident on a surface of the multilayer photonic structure from 0 degrees to 45 degrees normal to the surface. In some instances, the low reflectivity bandwidth can be positioned between the first high reflectivity bandwidth and the second high reflectivity bandwidth.

In another embodiment, a UV-IR reflector may include a plurality of coating layers of high index dielectric material having an index of refraction $n_H$ and a plurality of coating layers of low index dielectric material having an index of refraction $n_L$. The coating layers of high index dielectric material and the coating layers of low index dielectric material may be alternately arranged and a first coating layer and a last coating layer of the UV-IR reflector may include a low index material. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. The index-thicknesses of coating layers of low index dielectric material may be different than the index-thicknesses of coating layers of high index dielectric material. The UV-IR reflector may have a first high reflectivity bandwidth with a reflectance of 50% or greater for wavelengths of electromagnetic radiation in an ultraviolet portion of the electromagnetic spectrum and a second high reflectivity bandwidth with a reflectance of 50% or greater for wavelengths of light in an infrared portion of the electromagnetic spectrum.

In yet another embodiment, an article of manufacture includes a multilayer photonic structure. The multilayer photonic structure includes a plurality of coating layers of high index dielectric material having an index of refraction $n_H$ and a plurality of coating layers of low index dielectric material having an index of refraction $n_L$. The coating layers of high index dielectric material and the coating layers of low index dielectric material may be alternately arranged and a first coating layer and a last coating layer of the multilayer photonic structure comprise low index material. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. The index-thicknesses of coating layers of low index dielectric material may be different than the index-thicknesses of coating layers of high index dielectric material. The multilayer photonic structure has a first high reflectivity bandwidth, a second high reflectivity bandwidth and a low reflectivity bandwidth for electromagnetic radiation incident on a surface of the multilayer photonic structure from 0 degrees to 45 degrees, wherein the low reflectivity bandwidth is positioned between the first high reflectivity bandwidth and the second high reflectivity bandwidth.

Figure 2:
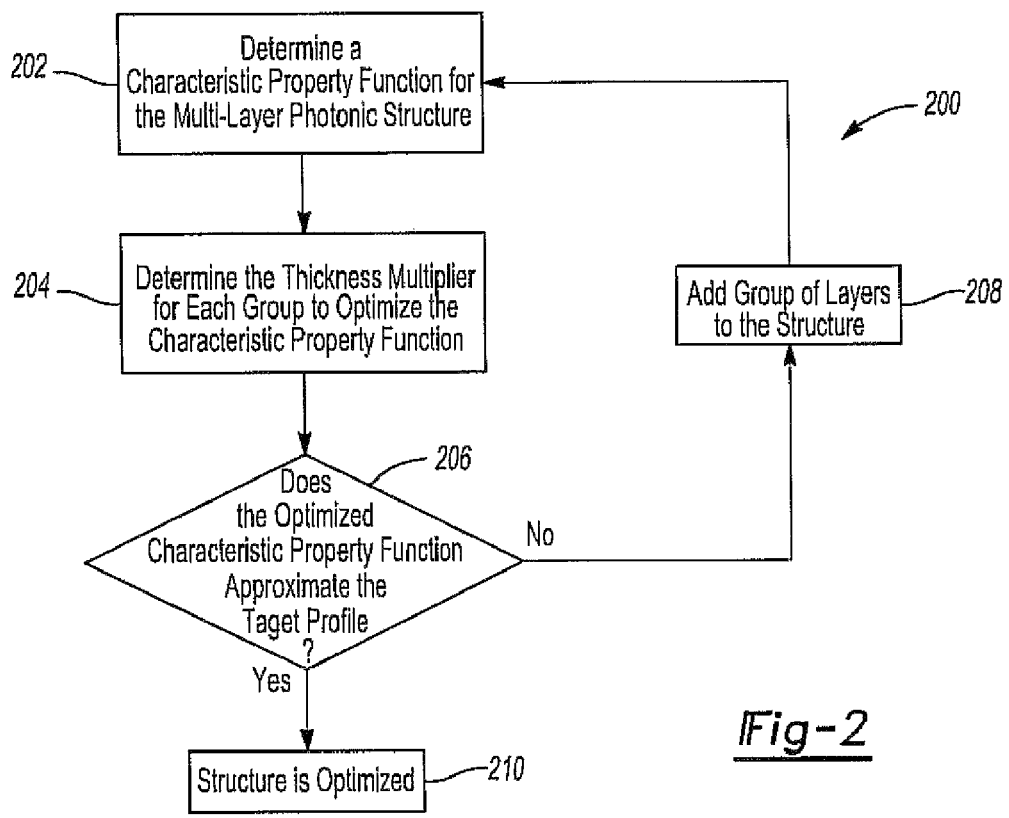
FIG. 2 illustrates a flow diagram for a method of producing a multilayer stack according to an embodiment of the present invention.

FIG. 2 generally depicts a flow diagram of one embodiment of a method for designing an omnidirectional, multilayer photonic structure to achieve a target characteristic property such as reflectance. The method may include selecting a target profile for the characteristic property as a function of the wavelength of light incident on the multilayer photonic structure. A basic layer structure for the multilayer photonic structure is also selected. The thickness of each layer of the basic layer structure may be expressed as a function of a wavelength of light incident on the structure, the index of refraction of the layer, and a thickness multiplier. A characteristic property function of the basic layer structure for a given angle of incident light may be determined as a function of the wavelength of incident light and the thickness multiplier. The thickness multiplier and, therefore, the thickness of each layer of the basic structure, may be determined by fitting the characteristic property function to the target profile. Methods for producing an omnidirectional multilayer photonic structure, and multilayer photonic structures produced thereby, will be described in more detail herein.

In describing the method for designing omnidirectional multilayer photonic structures, reference will be made to electromagnetic radiation incident on the multilayer photonic structure. It will be understood that the term "electromagnetic radiation" may be used interchangeably with the term "light" and that both terms refer to various wavelengths of the electromagnetic spectrum, particularly wavelengths in the ultraviolet (UV), infrared (IR), and visible portions of the electromagnetic spectrum.

Referring now to FIG. 1, a flow diagram 10 of the preliminary steps for designing a multilayer photonic structure having omnidirectional properties is illustrated. While the steps listed in the flow diagram 10 are set out and described in a specific sequence, it should be understood that the order in which the preliminary steps are performed may be varied.

In one embodiment, a process of designing a multilayer photonic structure having omnidirectional properties may include a preliminary step 12 of selecting a characteristic property for the multilayer structure. For example and for illustrative purposes only, the characteristic property can be the reflectance of the multilayer photonic structure. Reflectance, as used herein, refers to the fraction or percentage of light incident on the multilayer photonic structure which is reflected by the multilayer photonic structure and may be plotted as a function of the wavelength of light incident on the structure.

While specific embodiments of the methods for designing multilayer photonic structures described herein utilize reflectance as the characteristic property to be optimized, it should be understood that the methods described herein may, in the alternative, utilize the transmittance or absorptance as the characteristic property to be optimized. Transmittance, as used herein, refers to the fraction or percentage of light incident on the multilayer photonic structure which is transmitted or passed through the multilayer photonic structure and may be plotted as a function of the wavelength of light incident on the structure. Absorptance, as used herein, refers to the fraction or percentage of light incident on the multilayer photonic structure which is neither reflected nor transmitted and may be determined from the reflectance and the transmittance.

In another preliminary step 14, a target profile for the characteristic property is selected. In the embodiments described herein where the characteristic property is the reflectance of the multilayer photonic structure, a target reflectance profile may be selected such that the optimized multilayer photonic structure has certain reflectance characteristics. For example, in one embodiment, the target reflectance profile may be a square-well reflectance profile such that the optimized multilayer photonic structure reflects UV and IR light while being transparent to visible light. More specifically, the square-well reflectance profile may have 100% reflectance for wavelengths from about 200 nm to about 350 nm (e.g., wavelengths of light in the UV portion of the electromagnetic spectrum), 10% reflectance for wavelengths from about 350 nm to about 850 nm (e.g., wavelengths in the visible portion of the electromagnetic spectrum), and 100% reflectance for wavelengths from about 850 nm to about 2100 nm (e.g., wavelengths in the IR portion of the electromagnetic spectrum). Such a square-well reflectance profile is shown illustratively in FIG. 5.

While the target profile described hereinabove is a target reflectance profile having a square-well shape, it should be understood that other target profiles having different shapes may be utilized. For example, the target profile may be a curve or any other suitable shape for achieving a desired reflectance in the optimized multilayer photonic structure. Further, while the target profile described hereinabove is a target reflectance profile, it should be understood that the target profile may also be a target transmittance profile or a target absorption profile.

Another preliminary step 16 can include selecting a basic layer structure for the multilayer photonic structure. The multilayer photonic structures described herein generally includes layers of material with a first/relatively low refractive index $n_L$ (e.g., low index material) and layers of material with a second/relatively low refractive index $n_H$ (e.g., high index material) alternately arranged.

Figure 3:
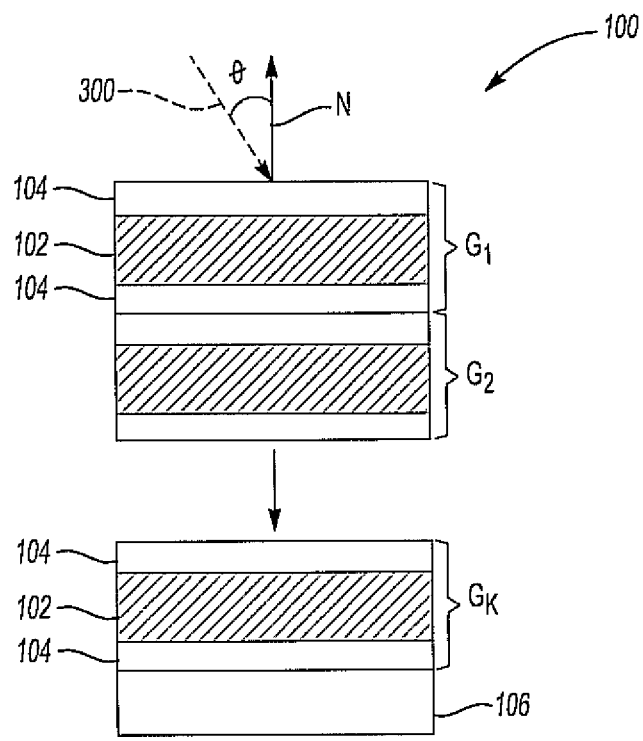
FIG. 3 illustrates a multilayer stack according to an embodiment of the present invention.

Referring to FIG. 3, in one embodiment, where the target profile is a target reflectance profile with a square-well shape, as described above, a basic layer structure of a multilayer photonic structure 100 can include one or more groups of layers $G_K$. Each group of layers $G_K$ can include alternating layers of high and low index materials. For example, a group of layers $G_K$ may comprise a single layer of high index material 102 disposed between two layers of low index material 104. In some instances, the multilayer photonic structure 100 can have a single group of layers (e.g., K=1) or, in the alternative, multiple groups of layers, in order to achieve the desired target profile. The multilayer photonic structure can be deposited on a substrate 106 which may include glass, polymeric materials, ceramic materials, metallic materials, composite materials, various combinations thereof and the like.

In the embodiment shown in FIG. 3, each group of layers $G_K$ can be described by the general form:

[0.5$m_K$L|$m_K$H|0.5$m_K$L]

where L represents a layer of low index material having a thickness $D_L$, H represents a layer of high index material having a thickness $D_H$, and $m_K$ is a thickness multiplier applied to the group $G_K$. Accordingly, the multilayer photonic structure 100 can have the general form:

[(0.5$m_K$L|$m_K$H|0.5$m_K$L)$^K$]

where K is an integer≥1 which represents the number of groups of layers $G_K$ in the designed multilayer photonic structure 100 such that a multilayer stack for K=3 would have a structure represented by:

[0.5$m_1$L|$m_1$H|0.5$m_1$L|0.5$m_2$L|$m_2$H|0.5$m_2$L|0.5$m_3$L|$m_3$H|0.5$m_3$L]

In the embodiment of the multilayer photonic structure shown in FIG. 3, the structure may be a non-quarter wave stack where the thickness $D_L$ of each layer of low index material 104 in a group of layers $G_K$ may be written as:

$$D_L = \frac{m_K \lambda_{ref}}{8n_L} \quad (1)$$

where $n_L$ is the index of refraction of the low index material, $\lambda_{ref}$ is a reference wavelength of light incidence on the coating and $m_K$ is a thickness multiplier for the group, as described above. Similarly, the thickness $D_H$ of each layer of high index material 102 in a group $G_K$ may be written as:

$$D_H = \frac{m_K \lambda_{ref}}{4n_H} \quad (2)$$

where $n_H$ is the index of refraction of the high index material, $\lambda_{ref}$ is a reference wavelength of light incidence on the coating and $m_K$ is a thickness multiplier for the group, as described above.

While FIG. 3 depicts one embodiment of the basic layer structure for a multilayer photonic structure 100, it should be understood that other structures may be utilized. For example, the multilayer photonic structure may have a different arrangement of layers and/or layer thicknesses. Further, it will be understood that the method described herein for producing multilayer photonic structures may be utilized in conjunction with such other structures.

Referring again to FIG. 1, in another preliminary step 18, values for the index of refraction $n_H$ of the high index material and the index of refraction $n_L$ of the low index material may be selected. In one embodiment, the values for $n_L$ and $n_H$ are selected such that the values are the same as commonly available materials. For example, the value of $n_L$ may be selected to be 1.5 while the value for $n_H$ may be selected to be 2.5 such that the values of $n_L$ and $n_H$ approximate the indices of refraction for silica ($SiO_2$, index of refraction 1.46) and anatase ($TiO_2$, index of refraction 2.49), respectively. Accordingly, a multilayer photonic structure design which utilizes 1.5 and 2.5 for $n_L$ and $n_H$, respectively, may be constructed from silica and anatase or other materials having the same or similar indices of refraction. It should be understood that other values for $n_L$ and $n_H$ may be selected which correspond to the indices of refraction of other materials. Table 1, shown below, contains a nonexclusive list of possible materials and their corresponding indices of refraction which may be utilized in the multilayer photonic structures described herein. In addition, some of the materials shown in Table 1 have a refractive index represented by a real part and an imaginary part (i). It is appreciated that the imaginary part can provide and/or represent an absorption part and/or quality of the material.

TABLE 1

| Refractive Index Materials (visible region) | |
| --- | --- |
| Material | Refractive Index |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |

TABLE 1-continued

Refractive Index Materials (visible region)

| Material | Refractive Index |
|---|---|
| Gallium Arsenate (GaAs) | 3.53 |
| Gallium Phosphate (GaP) | 3.31 |
| Vanadium (V) | 3 |
| Arsenic Selenide (As$_2$Se$_3$) | 2.8 |
| CuAlSe$_2$ | 2.75 |
| Zinc Selenide (ZnSe) | 2.5-2.6 |
| Titanium Dioxide (TiO$_2$)-solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1 naphthyl)-4,4'Diamine (NPB) | 1.7 |
| Polyamide-imide (PEI) | 1.6 |
| Zinc Sulfide (ZnS) | 2.3 + i(0.015) |
| Titanium Nitride (TiN) | 1.5 + i(2.0) |
| Chromium (Cr) | 2.5 + i(2.5) |
| Niobium Pentoxide(Nb2O5) | 2.4 |
| Zirconium Oxide (ZrO2) | 2.36 |
| Hafnium Oxide (HfO2) | 1.9-2.0 |
| Fluorcarbon (FEP) | 1.34 |
| Polytetrafluro-Ethylene (TFE) | 1.35 |
| Fluorcarbon (FEP) | 1.34 |
| Polytetrafluro-Ethylene(TFE) | 1.35 |
| Chlorotrifluoro-Ethylene(CTFE) | 1.42 |
| Cellulose Propionate | 1.46 |
| Cellulose Acetate Butyrate | 1.46-1.49 |
| Cellulose Acetate | 1.46-1.50 |
| Methylpentene Polymer | 1.485 |
| Acetal Homopolymer | 1.48 |
| Acrylics | 1.49 |
| Cellulose Nitrate | 1.49-1.51 |
| Ethyl Cellulose | 1.47 |
| Polypropylene | 1.49 |
| Polysulfone | 1.633 |
| Chromium (Cr) | 3.0 |
| Tin Sulfide (SnS) | 2.6 |
| Low Porous Si | 2.56 |
| Chalcogenide glass | 2.6 |
| Cerium Oxide (CeO$_2$) | 2.53 |
| Tungsten (W) | 2.5 |
| Gallium Nitride (GaN) | 2.5 |
| Manganese (Mn) | 2.5 |
| Niobium Oxide (Nb$_2$O$_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide (TiO$_2$)-vacuum deposited | 2.43 |
| Hafnium Oxide (HfO$_2$) | 2.0 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Niobium Oxide (Nb$_2$O$_5$) | 2.1 |
| Aluminum (Al) | 2.0 + i(15) |
| Silicon Nitride (SiN) | 2.1 |
| Mica | 1.56 |
| Polyallomer | 1.492 |
| Polybutylene | 1.50 |
| Ionomers | 1.51 |
| Polyethylene (Low Density) | 1.51 |
| Nylons (PA) Type II | 1.52 |
| Acrylics Multipolymer | 1.52 |
| Polyethylene (Medium Density) | 1.52 |
| Styrene Butadiene Thermoplastic | 1.52-1.55 |
| PVC (Rigid) | 1.52-1.55 |
| Nylons (Polyamide) Type 6/6 | 1.53 |
| Urea Formaldehyde | 1.54-1.58 |
| Polyethylene (High Density) | 1.54 |
| Styrene Acrylonitrile Copolymer | 1.56-1.57 |
| Polystyrene (Heat & Chemical) | 1.57-1.60 |
| Polystyrene (General Purpose) | 1.59 |
| Polycarbornate (Unfilled) | 1.586 |

In addition to values for $n_L$ and $n_H$, values for the indices of refraction for the substrate $n_{substrate}$ on which the multilayer photonic structure is deposited and the incidence material $n_0$ (e.g., the index of refraction of the medium directly adjacent to the uppermost or final layer of the structure) may also be assigned. For example, when the optimized multilayer photonic structure will be deposited on glass, $n_{substrate}$ is about 1.52. When the medium directly adjacent the uppermost layer of the structure is air, $n_0$ is about 1.0. It should be understood that the values for $n_{substrate}$ and $n_0$ may vary according to the specific substrates and environments in which the multilayer photonic structure is used.

Turning now to FIG. 2, a flow diagram is depicted of a process 200 for producing a multilayer photonic structure. For purposes of illustration, the various steps of the method 200 for producing a multilayer photonic structure will be described with specific reference to a multilayer photonic structure which reflects UV and IR light but is generally transparent to (or transmits) visible light, as described above. This multilayer photonic structure may be referred to herein as a "UV-IR reflector". Accordingly, in the preliminary steps described above, the characteristic target property is the reflectance of the multilayer photonic structure, the target profile is a target reflectance profile having a square-well shape, and the basic layer structure of the multilayer photonic structure is a three layer structure having the form $[0.5m_K L|m_K H|0.5m_K L]$. However, it should be understood that the method described herein may be used in conjunction with various other target profiles, basic layer structures and characteristic properties.

In a first step 202, a characteristic property function is determined for the multilayer photonic structure. Characteristic property function, as used herein, is defined as a function describing a particular characteristic property of the multilayer photonic structure such as, for example, the reflectance or transmittance. In the example described herein, the characteristic property is the reflectance of the multilayer photonic structure. The characteristic property function may be determined as a function of the thickness multiplier $m_K$ of each group of layers $G_K$ in the structure over a range of wavelengths of interest. The characteristic property function may be initially determined for a single group of layers $G_K$ having the basic layer structure and, thereafter, additional layers may be added to the structure to further optimize the characteristic property.

In one embodiment, when the characteristic property is the reflectance, the characteristic property function is the reflectance of the multilayer photonic structure and may be determined using a transfer matrix method where the reflectance of the multilayer structure can be dependent on: (1) angle of light incident on the coating (e.g., the angle of incidence); (2) degree of polarization; (3) wavelength(s) of interest; (4) thicknesses of each layer of the multilayer photonic structure; and (5) indices of refraction of the low and high index materials, the transmission medium, and the incidence medium. The transfer matrix method will now be described in more detail.

The "matrix method" refers to a methodology for calculating the reflectance and transmittance of a photonic structure using matrix algebra as described in the Ph.D. thesis entitled "Fundamental Studies of Polyelectrolyte Multilayer Films: Optical Mechanical and Lithographic Property Control" by Adam John Nolte (Massachusetts Institute of Technology, 2007). The propagation of light in a multilayer photonic structure may be understood by examining the diffraction of light in each layer of the structure. However, it should be understood that other methods for calculating the reflectance and the transmittance of a photonic structure may be used.

The symbol "j" used herein refers to a single layer of a photonic structure having an index of refraction and thickness of $n_j$ and $d_j$ respectively. For a photonic structure comprising j distinguishable layers, there are j+1 interfaces in the structure. For purposes of describing the transfer matrix method, the incidence medium (e.g., the medium adjacent to the uppermost layer of the structure) is labeled with a subscript of "0", and the substrate medium on which the photonic structure is deposited with a subscript of "j+1". For example, the incidence medium has an index of refraction $n_0$ while the substrate layer has an index of refraction $n_{j+1}$. Inside a layer j, electro-magnetic radiation undergoes a shift in phase of $i \cdot \delta_j$ such that:

$$\delta_j = \frac{2\pi \cdot n_j \cdot d_j \cdot \cos\theta_j}{\lambda} \quad (3)$$

where $\lambda$ is the wavelength of the incident light, $\theta_j$ is the angle of refraction in layer j, which by Snell's Law is given by:

$$n_0 \sin\theta_0 = n_j \sin\theta_j \quad (4)$$

where, by the notation introduced above, $n_0$ and $\theta_0$ are the refractive index and angle of incidence in the incident medium. Referring again to FIG. 3, the angle of incidence, as used herein, is the angle between a ray of incident light 300 and a normal N to the uppermost surface of the multilayer photonic structure. It will be understood that Equation (4) may be solved for $\theta_j$ such that $\theta_j$ is a function of the angle of incidence $\theta_0$ of light on the layer.

The light incident on the layer has an electric field component and a magnetic field component. Accordingly, the magnitudes of the total electric (E) and magnetic (H) field for the transverse electric polarization (TE) and the transverse magnetic polarization (TM) at each interface in the structure may be written as:

$$E_{j \cdot TE} = E_j^+ + E_j^- \quad (5)$$

$$H_{j \cdot TE} = \eta_{j \cdot TE} \cdot (E_j^+ - E_j^-) \quad (6)$$

$$E_{j \cdot TM} = (E_j^+ - E_j^-) \cdot \cos(\theta_j) \quad (7)$$

$$H_{j \cdot TM} = \eta_{j \cdot TM} \cdot (E_j^+ - E_j^-) \cdot \cos(\theta_j) \quad (8)$$

where the particular form of $\eta_j$, the optical admittance depends upon the polarization:

$$\eta_{j \cdot TE} = \sqrt{\frac{\varepsilon_0}{\mu_0}} \cdot n_j \cdot \cos\theta_j \quad \text{(for TE polarized radiation)} \quad (9)$$

$$\eta_{j \cdot TM} = \sqrt{\frac{\varepsilon_0}{\mu_0}} \cdot n_j / \cos\theta_j \quad \text{(for TM polarized radiation)} \quad (10)$$

with $\varepsilon_o$ and $\mu_0$ equal to the permittivity and permeability of a vacuum, respectively, where $$\mu_0 = 4\pi \cdot 10^{-7} \frac{H}{m} \text{ and } \varepsilon_0 = \frac{1}{c^2 \cdot \mu_0} \approx 8.85 \cdot 10^{-12} \frac{F}{m}$$

and c is the speed of light in a vacuum.

Equations (3)-(10) may be rewritten in a matrix that relates the electric and magnetic fields at interfaces j and j+1 in terms of the properties of layer j:

$$\begin{bmatrix} E_j \\ H_j \end{bmatrix} = \begin{bmatrix} \cos\delta_j & \frac{i \cdot \sin\delta_j}{\eta_j} \\ i \cdot n_j \cdot \sin\delta_j & \cos\delta_j \end{bmatrix} \begin{bmatrix} E_{j+1} \\ H_{j+1} \end{bmatrix} = M_j \begin{bmatrix} E_{j+1} \\ H_{j+1} \end{bmatrix} \quad (11)$$

where $M_j$ is known as the characteristic matrix of a particular layer j. A total transfer matrix ($M_T$), also called a characteristic matrix, for the entire multilayer photonic structure, may be obtained by multiplying the characteristic matrices for each individual layer in the multilayer photonic structure such that:

$$M_T = M_1 \cdot M_2 \ldots M_j = \prod_{j=1}^{J} M_j = \begin{bmatrix} m_{11} & m_{12} \\ m_{21} & m_{22} \end{bmatrix} \quad (12)$$

and, $$\begin{bmatrix} E_0 \\ H_0 \end{bmatrix} = M_T \begin{bmatrix} E_{J+1} \\ H_{J+1} \end{bmatrix} \quad (13)$$

The amplitude reflection (r) and transmission (t) coefficients can be determined from $M_T$ as follows:

$$r_{TE} = \frac{E_0^-}{E_0^+} = \frac{\eta_{0 \cdot TE} m_{11} + \eta_{0 \cdot TE} \eta_{J+1 \cdot TE} m_{12} - m_{21} - \eta_{J+1 \cdot TE} m_{22}}{\eta_{0 \cdot TE} m_{11} + \eta_{0 \cdot TE} \eta_{J+1 \cdot TE} m_{12} + m_{21} + \eta_{J+1 \cdot TE} m_{22}} \quad (14)$$

$$t_{TE} = \frac{E_{J+1}^+}{E_0^+} = \frac{2\eta_{0 \cdot TE}}{\eta_{0 \cdot TE} m_{11} + \eta_{0 \cdot TE} \eta_{J+1 \cdot TE} m_{12} + m_{21} + \eta_{J+1 \cdot TE} m_{22}} \quad (15)$$

-continued $$r_{TM} = \frac{\eta_{0\text{-}TM} m_{11} + \eta_{0\text{-}TM}\eta_{J+1\text{-}TM} m_{12} - m_{21} - \eta_{J+1\text{-}TM} m_{22}}{\eta_{0\text{-}TM} m_{11} + \eta_{0\text{-}TM}\eta_{J+1\text{-}TM} m_{12} + m_{21} + \eta_{J+1\text{-}TM} m_{22}} \quad (16)$$

$$t_{TM} = \frac{2\eta_{0\text{-}TM}}{\eta_{0\text{-}TM} m_{11} + \eta_{0\text{-}TM}\eta_{J+1\text{-}TM} m_{12} + m_{21} + \eta_{J+1\text{-}TM} m_{22}} \cdot \frac{\cos(\theta_0)}{\cos(\theta_s)} \quad (17)$$

from which the reflectance (R) and transmittance (T), which are the actual fractions of light reflected and transmitted by the multilayer photonic structure, respectively may be calculated. Specifically:

$$R = r \cdot r^* \quad (18)$$

$$T = t \cdot t^* \cdot \frac{\Re(n_s) \cdot \cos[\Re(\theta_2)]}{\Re(n_0) \cdot \cos[\Re(\theta_0)]}. \quad (19)$$

$$A = 1 - R - T \quad (20)$$

The variable "A" refers to the absorptance of the multilayer photonic structure, which, as described above, is the fraction of the incident power that is absorbed by the structure and not reflected or transmitted. It should be understood that equations (3)-(20) may be implemented with a computer comprising software programmed to receive various inputs from a user related to the properties of a particular multilayer photonic structure and determine function(s) for the reflectance R, the transmittance T and/or the absorptance A. Such software may be referred to as a photonics calculator.

As noted above, the transfer matrix method may be used to determine both the reflectance and the transmittance of the multilayer photonic structure. Accordingly, while specific examples used herein describe determining the reflectance for a specific multilayer photonic structure (e.g., the UV-IR reflector) using the transfer matrix method, it should be understood that the transfer matrix method may also be used to determine the transmittance of the structure and that the process described herein may also be utilized to optimize the transmittance.

By way of example, for a UV-IR reflector as described above, the thickness $d_j$ of each layer of the multilayer photonic structure is defined by Equations (1) and (2) where the reference wavelength $\lambda_{ref}$ is 550 nm and $n_L$ and $n_H$ are 1.5 and 2.5, respectively. Accordingly, $\delta_j$ in Equation (3) may be written as a function of the thickness multiplier $m_K$ for each group $G_K$ of layers. Similarly, the index of refraction $n_j$ of each layer in the multilayer photonic structure may be either 1.5 or 2.5 depending on whether the layer comprises high index material or low index material. The incidence medium may be air such that $n_0$ is 1 and the substrate medium is glass such that $n_{j+1}$ is 1.52. For this example, the incident light is natural, white light having equal contributions of TE and TM modes such that the degree of polarization is 0.5. The light incident on the coating may have a wavelength $\lambda$ from about 200 nm to about 2100 nm and the angle of incidence $\theta_0$ of the light can be initially set to 0°. Based on these exemplary conditions, the reflectance R of the multilayer photonic structure is dependent on the wavelength of light incident on the multilayer photonic structure and the thickness multiplier $m_K$ for each group of layers $G_K$ in the structure. An equation or system of equations for determining the reflectance and/or transmittance of the multilayer photonic structure may be determined using the transfer matrix method, described above, in conjunction with a photonics calculator.

In a next step 204, the thickness multiplier $m_K$ for each group of layers $G_K$ is optimized such that the multilayer photonic structure has a specific property. For example, the UV-IR reflector described herein may be optimized such that the UV-IR reflector reflects a certain percentage of light at a specific wavelength while reflecting a different amount of light at another wavelength. In order to optimize the thickness multiplier $m_K$, the characteristic property function may be compared to a target profile. In the example of the UV-IR reflector described herein, the characteristic property function is the reflectance R and the target profile is a target reflectance profile. As described above, to produce a UV-IR reflector, the target reflectance profile can be a square-well shape such that the reflectance of the corresponding structure is 100% for UV and IR wavelengths while the reflectance in the visible spectrum is less than 100%.

The value of the thickness multiplier $m_K$ may be determined by curve fitting the equation for the reflectance R, as determined through the transfer matrix method, to the target reflectance profile. Specifically, the reflectance R may be fit to the target reflectance profile by adjusting the thickness of the layers in each group of layers $G_K$ in the multilayered photonic structure. This may be accomplished by adjusting the value of the thickness multiplier $m_K$ for each group of layers $G_K$. Accordingly, the optimization or curve fitting process yields values for the thickness multiplier $m_K$ such that the characteristic property function, in this case the reflectance R, approximates the target profile.

In one embodiment, values for $m_K$ may be determined by fitting the characteristic property function to the target profile using a non-linear curve fitting algorithm. For example, the non-linear curve fitting algorithm may solve a function through the minimization of the sum of the squared difference of a given function containing a vector of variables (e.g., the reflectance R) and a set of target coordinates (e.g., the target reflectance profile). In such an example, the minimization of the sum of squares difference can have the form:

$$\min \Sigma (F(x,y) - F(x, y_{Target}))^2$$

where $F(x,y)$ is the reflectance R and $F(x, y_{Target})$ is the target reflectance profile.

The non-linear curve fitting algorithm described herein may be implemented with a computer system comprising software programmed to perform the non-linear curve fitting algorithm. In one embodiment, the curve fitting algorithm may be a part of the same software package as the photonics calculator described above. Accordingly, it will be understood that the software package may be operable to (1) receive inputs from a user related to the various parameters of a multilayer photonic structure; (2) receive a target profile input by a user; (3) determine a characteristic property function for the multilayer photonic structure based on the received inputs; and (4) fit the characteristic property function to the received target profile and thereby determine one or more thickness multipliers for a group of layers of the multilayer photonic structure. Alternatively, a suitable curve fitting algorithm which may be employed for determining values for $m_K$ may be the LSQCURVEFIT function of the Optimization Toolbox™ of the software package Matlab®.

The equation for the reflectance R and the target reflectance profile may be imported into the software and solved for values of $m_K$ over a range of wavelengths from about 200 nm to about 2100 nm such that the reflectance R approximates the target reflectance profile. For example, Table 2, shown below, is indicative of values of thickness multipliers $m_K$ for K=1, 2, 3, and 4 which, in turn, corresponds to multilayer photonic structures having 1, 2, 3 and 4 groups of layers. The values of $m_K$ in Table 2 were calculated utilizing the minimization of the sum of the squared difference algorithm for light having an angle of incidence $\theta_0$ of 0° with a multilayer stack having K=3 represented by:

[$0.5m_1L|m_1H|0.5m_1L|0.5m_2L|m_2H|0.5m_2L|0.5m_3L|m_3H|0.5m_3L$]

with m1, m2, m3 equal to 1.7646, 1.8291, 1.7600, respectively.

TABLE 2

| K | $m_1$ | $m_2$ | $m_3$ | $m_4$ |
|---|-------|-------|-------|-------|
| 1 | 1.6749 | — | — | — |
| 2 | 1.7472 | 1.8290 | — | — |
| 3 | 1.7646 | 1.8291 | 1.7600 | — |
| 4 | 1.7638 | 1.9536 | 1.7475 | 1.7167 |

While the aforementioned curve fitting technique references the use of the sum of the squared difference algorithm, it should be understood that various other non-linear curve fitting techniques may be used in order to fit the reflectance R to the target reflectance profile and thereby determine the thickness multipliers $m_K$ for each group of layer $G_K$ in the multilayer photonic structure.

Figure 4:
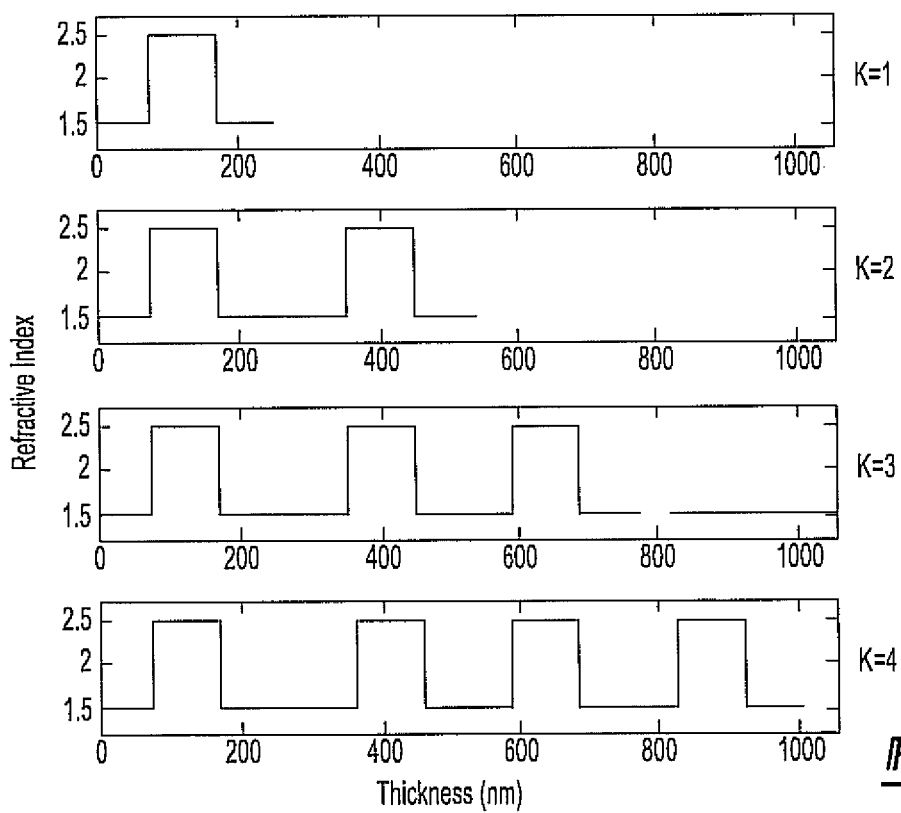
FIG. 4 illustrates thicknesses of each layer of a multilayer stack having 1, 2, 3 and 4 multilayer groups where each group has alternating layers of low index of refraction material and high index of refraction material.

Referring now to FIG. 4, a series of plots depicting the layer thickness ($D_L$, $D_H$) vs. the index of refraction of the layer are shown for the UV-IR reflector having multilayer structures with 1, 2, 3 and 4 groups of layers $G_K$ (e.g., K=1, 2, 3, 4). The thickness of each layer of the UV-IR reflector was calculated utilizing Equations (1) and (2) and the values for $m_K$ from Table 2.

Referring again to FIG. 2, in step 206, the characteristic property function may be adjusted or optimized by incorporating the thickness multiplier into the previously determined characteristic property function. For example, the thickness multiplier may be incorporated into Equation (3) above, such as when the values of $D_L$ and $D_H$ are a function of the thickness multiplier. The adjusted or optimized characteristic property function is then compared to the target profile to determine if the optimized characteristic property function approximates the target profile. For example, for the UV-IR reflector, the optimized reflectance (e.g., the reflectance incorporating the thickness multipliers $m_K$ determined in step 204) may be plotted as a function of wavelength on the same axes as the square-well target reflectance profile to determine if the optimized reflectance approximates the target reflectance profile. For example, for a UV-IR reflector made according to an embodiment of the present invention, the reflectance approximates the target reflectance profile when the reflectance in the visible range is less than about 30% and the reflectance in the UV and near IR range is greater than about 90% of the target reflectance. It will be understood that the degree of approximation may vary depending on the desired properties of the resulting omnidirectional multilayer photonic structure.

Figure 5:
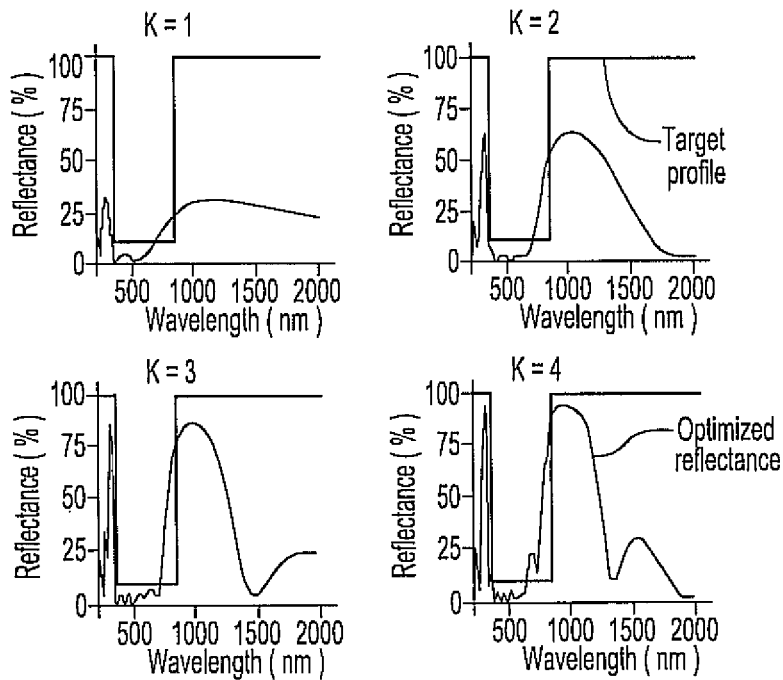
FIG. 5 graphically illustrates the reflectance as a function of wavelength for light having an angle of incidence of 0° on a multilayer stack having 1, 2, 3 and 4 multilayer groups according to an embodiment of the present invention.
Figure 6A:
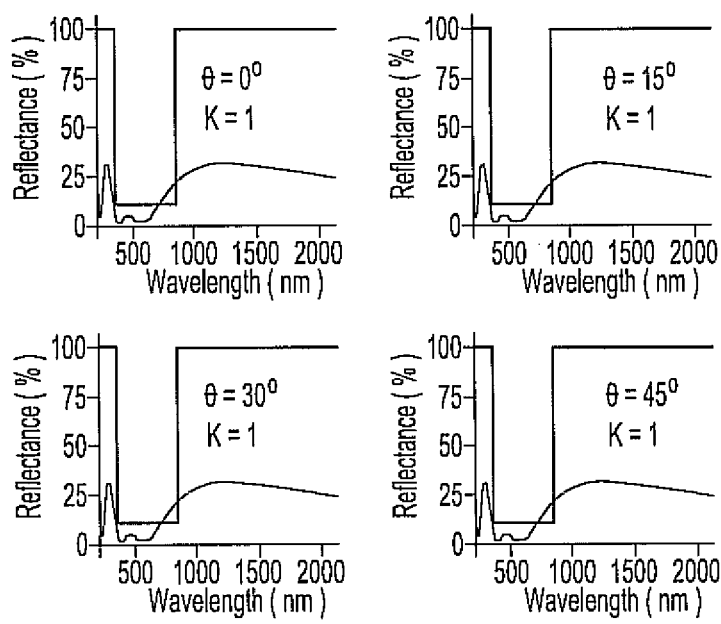
FIGS. 6A-6D graphically illustrate the reflectance as a function of wavelength for light having an angle of incidence of 0°, 15°, 30° and 45° for multilayer stacks having 1, 2, 3 and 4 multilayer groups.
Figure 6B:
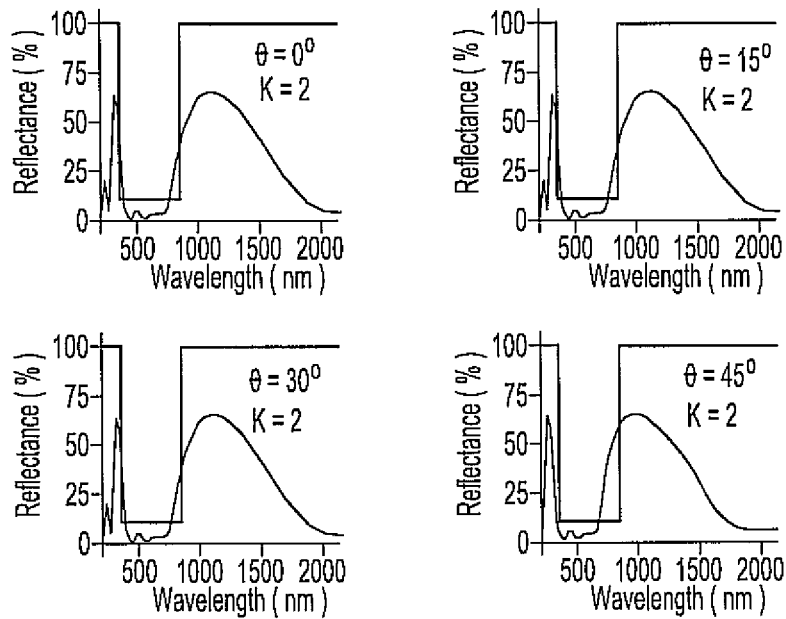
Figure 6C:
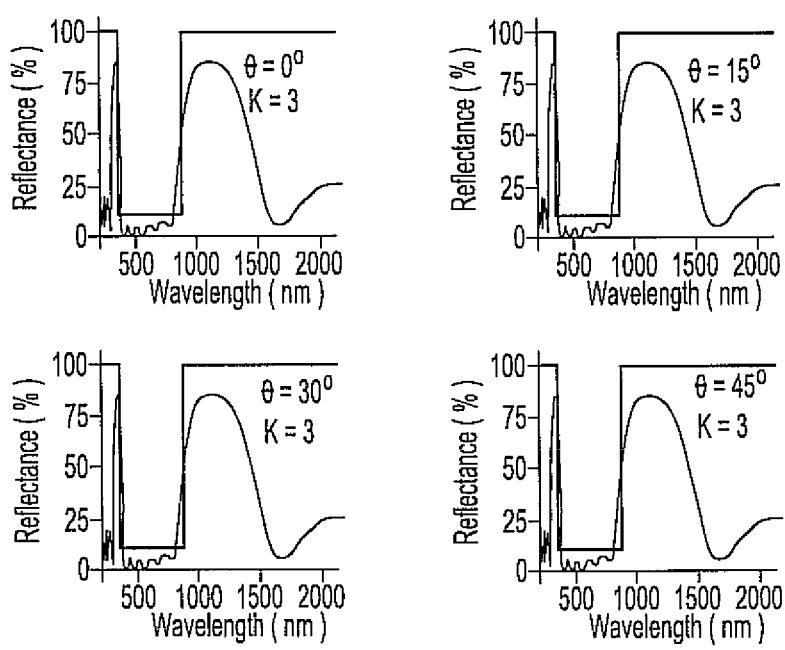
Figure 6D:
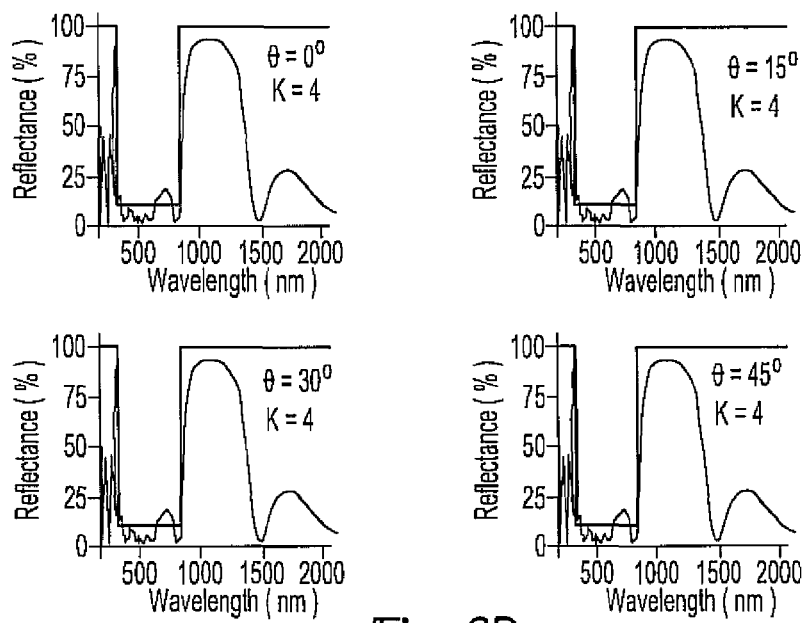

Referring now to FIG. 5 by way of example, after values for $m_K$ have been determined for each group of layers $G_K$ in the multilayer photonic structure, the reflectance of the structure may be plotted as a function of the wavelength of light incident on the multilayer photonic structure along with the square-well reflectance profile described above. As shown in the figure, when the multilayer photonic structure comprises a single group of layers (e.g., K=1), the optimized reflectance does not closely approximate the target reflectance profile. However, as the number of groups of layers in the multilayer structure is increased (e.g., K=2, 3, 4), the optimized reflectance more closely approximates the target reflectance profile.

Referring again to FIG. 2, if the degree of approximation between the reflectance and the target reflectance profile is determined to be insufficient in step 206, the method 200 proceeds to step 208. In step 208, one or more additional groups of layers $G_K$ may be added to the multilayer photonic structure. As noted above and graphically illustrated in FIG. 5, the addition of groups of layers $G_K$ to the multilayer photonic structure may further optimize the multilayer photonic structure such that the optimized reflectance more closely approximates the target reflectance profile. For the specific example of the UV-IR reflector, it has been determined that four groups of layers (e.g., K=4) sufficiently approximates the target reflectance profile.

After additional groups of layers $G_K$ are added to the multilayer photonic structure, steps 202 and 204 are repeated for the entire multilayer photonic structure. For example, if the multilayer photonic structure initially comprised one group of layers (e.g., K=1) and a second group of layers was added to the structure in step 208 such that K=2, steps 202 and 204 are repeated such that the thickness multipliers $m_1$ and $m_2$ for groups $G_1$ and $G_2$, respectively, are determined. It should be noted that the addition of groups of layers to existing groups of layers requires that any previously determined thickness multipliers $m_K$ be re-determined in order to optimize the characteristic property function for the multilayer photonic structure. For example, Table 2 shows that each additional group of layers added to the structure causes a change in the thickness multiplier for each previous group of layers.

The method 200 loops from step 206 to step 202 and additional groups of layers are added to the multilayer photonic structure until the optimized characteristic property of the multilayer photonic structure approximates the target reflective profile. As noted above, the UV-IR reflector is optimized when the structure comprises four groups of layers. Once the target profile is approximated, the optimization algorithm is complete (e.g., structure is optimized at 210).

As noted hereinabove, the multilayer photonic structure is initially optimized for light having an angle of incidence of 0°. However, in order to tune the multilayer photonic structure such that the characteristic property is optimized for omnidirectional properties, such as omnidirectional reflectance, the method 200 may be repeated for various other angles of incident light. Omnidirectional reflectance, as used herein, refers to light being reflected above a predefined level, e.g. 50%, 60%, 70%, 80%, 90%, etc., irrespective of the angle of incidence. FIGS. 6A-6D show the optimized reflectance as a function of wavelength for various values of K (e.g., K=1, 2, 3, and 4) and various angles of incidence (e.g., $\theta_0$=0°, 15°, 30° and 45°). While the data depicted in FIGS. 6A-6D is optimized for angles of incidence from data depicted in FIGS. 6A-6D is optimized for angles of incidence from 0° to 45°, it should be understood that the multilayer photonic structures described herein may be further optimized for other angles of incidence from about 0° up to less than about 90°. In addition, increasing the angle of light incident on the coating only minimally affects the optimized reflectance. Specifically, as the angle of incidence is increased, there is a slight shift in the reflectance at higher wavelengths in the direction of lower wavelengths. However, it should be noted that this shift does not result in interference with the visible spectra. Accordingly, FIGS. 6A-6D indicate that the method described herein may be used to effectively "tune" a multilayer photonic structure to achieve omnidirectional characteristic properties, specifically omnidirectional reflectivity.

After performing the method 200 for various angles of incident light, and thereby determining the thickness multipliers $m_K$ for each group of layers $G_K$ at each angle of incidence, the thickness multipliers may be averaged together. Table 3, shown below, contains the average value for the thickness multipliers $M_{KAVG}$ for the UV-IR reflector described herein such that the UV-IR reflector is tuned for omnidirectional reflectivity.

TABLE 3

| K | $m_{1AVG}$ | $m_{2AVG}$ | $m_{3AVG}$ | $m_{4AVG}$ |
|---|---|---|---|---|
| 1 | 1.7210 | — | — | — |
| 2 | 1.8111 | 1.8791 | — | — |
| 3 | 1.8290 | 1.8882 | 1.8168 | — |
| 4 | 1.8621 | 1.8080 | 2.0492 | 1.7078 |

Once the thickness multiplier(s) $m_{KAVG}$ have been determined such that the multilayer photonic structure is optimized for omnidirectional properties, the thickness of each layer of the multilayer photonic structure may be calculated utilizing $M_{KAVG}$. For example, an omnidirectional UV-IR with K groups of layers can have the form $[(0.5m_{KAVG}L|m_{KAVG}H|0.5\ m_{KAVG}L)^K]$, the thickness $D_L$ of each layer of low index material L and the thickness $D_H$ of each layer of high index material H may be calculated using Equations (1) and (2). As described above, the UV-IR reflector may have layers of low index material and high index material having indices of refraction $n_L$ and $n_H$ of 1.5 and 2.5, respectively, and the reference wavelength $\lambda_{ref}$ is 550 nm. Values for the thickness of each layer in the multilayer photonic structure are shown below in Table 4. The thickness multipliers $m_{KAVG}$ K=4 were used to calculate the thickness of each layer.

TABLE 4

| K | $m_{KAVG}$ | $D_L$ (nm) | $D_H$ (nm) |
|---|---|---|---|
| 1 | 1.8621 | 85.2842 | 102.4155 |
| 2 | 1.8080 | 82.8064 | 99.44 |
| 3 | 2.0492 | 93.8534 | 112.706 |
| 4 | 1.7078 | 78.2172 | 93.929 |

Once the thickness of each layer in the multilayer photonic structure has been determined, the multilayer photonic structure may be deposited on a substrate such that each layer of the multilayer photonic structure has the proper thickness to achieve the desired omnidirectional properties in the multilayer photonic structure. Various material deposition and/or materials processing techniques may be used to deposit the multilayer structure on the substrate including, without limitation, physical vapor deposition, chemical vapor deposition, sol gel processes, electron beam evaporation of alternating layers, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, poly-electrolyte multilayer deposition by 'layer by layer' processing and/or combinations thereof. The aforementioned techniques may be used to deposit the multilayer photonic structures on substrates formed from various material including, without limitation, metals, alloys, polymers, ceramics, glass and combinations thereof.

By way of illustration, the UV-IR reflector described hereinabove may be implemented by depositing layers of high and low index materials to form the multilayer photonic structure 100 depicted in FIG. 3. For example, as described hereinabove, the high index material 102 may comprise a material with an index of refraction $n_H$ of 2.5, such as anatase, while the low index material 104 may comprise a material with an index of refraction $n_L$ of 1.5, such as silica. The high and low index materials may be deposited on a glass substrate ($n_{substrate}$=1.52) in groups of 3 layers where each group has the form [0.5 $m_K$L $m_K$H 0.5 $m_K$L]. As noted herein, the multilayer photonic structure comprises 4 groups of layers such that the overall structure may be written as $[(0.5\ m_KL\ m_KH\ 0.5\ m_KL)^4]$. The thickness of each low index layer L and each high index layer H in each group $G_K$ are shown above in Table 4.

The multilayer photonic structure 100 has been described herein as comprising groups of layers having the form $[0.5m_KL|m_KH|0.5m_KL]$ where each layer of high index material and each layer of low index material in each group of layers has a specified thickness to achieve a particular target reflectance profile, such as the square-well target reflectance profile graphically depicted in FIGS. 5 and 6. However, when each three layer group is deposited, it should be understood that adjacent layers of similar materials (i.e., adjacent layers of low index materials when the group of layers have the form $[0.5m_KL|m_KH|0.5\ m_KL]$) may be deposited as a single layer which has a thickness which is the sum of the thicknesses of the individual layers. For example, referring to FIG. 1 and Table 4 which describes a photonic structure having four groups of layers with the form $[0.5m_{KAVG}L|m_{KAVG}H|0.5m_{KAVG}L]$, a group of layers $G_4$ (i.e., $G_K$ in FIG. 1) may be deposited on the substrate 106 (which, in this example, is a quartz glass substrate). The layers of low index material 104 in the group of layers $G_4$ have a thickness of 78.2172 nm while the layer of high index material 102 in the group of layers $G_4$ has a thickness of 93.929 nm. A group of layers $G_3$ may be deposited over the group of layers $G_4$ such that the bottom layer of low index material in the group of layers $G_3$ is directly adjacent the top layer of low index material of the first group of layers $G_4$. The layers of low index material 104 in the group of layers $G_3$ have a thickness of 93.8534 nm and the layer of high index material 102 of the second group of layers $G_3$ is 112.706. Because of their relative orientations, the bottom layer of low index material 104 in the group of layers $G_3$ and the top layer of low index material 104 in the group of layers $G_4$ may be deposited as a single layer having a thickness of 172.0706 nm (i.e., 78.2172 nm+93.8534 nm). Accordingly, a single layer of low index material having a thickness of 172.0706 nm may be deposited between the layer of high index material of the group of layers $G_4$ and the layer of high index material of the group of layers $G_3$. The group of layers $G_2$ may be deposited over the group of layers $G_3$ in a similar manner and the group of layers $G_1$ may be deposited over the group of layers $G_2$ to complete the multilayer photonic structure comprising four groups of layers. To differentiate between the layers of high index and low index materials in the groups $G_K$ and the layers of high index and low index materials actually deposited on the substrate to form the multilayer photonic structures, the layers of high index materials and low index materials actually deposited on the substrate can be referred to as coating layers (e.g., the high index coating layers and low index coating layers).

Based on the foregoing example, it should be understood that the multilayer photonic structures described herein comprise alternating coating layers of low index material and high index material having specific thicknesses to achieve a particular target reflectance profile which, in the examples described herein, is a square well profile having a first high reflectivity bandwidth and a second high reflectivity bandwidth separated by a low reflectivity bandwidth as shown in FIGS. 5 and 6. The alternating coating layers of high index material and low index material vary in thickness. More specifically, each high index coating layer has a different thickness than the other high index coating layers and each low index coating layer has a different thickness than the other low index coating layers. Moreover, the low index coating layers have thicknesses which are different than the thicknesses of the high index coating layers. Accordingly, it should be understood that the index-thickness, defined herein as the product of the index of refraction of a coating layer and the thickness of a coating layer, is different for each coating layer of low index material and each coating layer of high index material. Further, it should be understood that the index-thickness of each coating layer of low index material is different than the index-thickness of each coating layer of high index material. For a coating layer of low index material having an index of refraction $n_L$ and thickness $D'_L$ and a coating layer of high index material having an index of refraction $n_H$ and thickness $D'_H$ this may be expressed as:

$$n_L D'_L \neq n_H D'_H$$

Also, it should be understood that the low index coating layers and the high index coating layers have non-quarter wave thicknesses such that, for any high index coating layer or any low index coating material the index-thicknesses are not equal to one quarter of the reference wavelength. This may be expressed mathematically as:

$$n_H D'_H \neq \frac{\lambda_{ref}}{4} \neq n_L D'_L$$

As described herein, each coating layer of the multilayer photonic structure may have a specific thickness in order to achieve a multilayer photonic structure with a specified reflectance profile. In one embodiment, the thickness of the coating layers (both high index and low index) may be from about 10 nm to about 400 nm. In another embodiment, the thickness of the coating layers may be from about 50 nm to about 200 nm. The particular thickness of each coating layer is dependent on the specific indices of refraction of the low and high index materials, the total number of coating layers in the multilayer photonic structure, the thickness of the other layers in the photonic structure as well as the particular reflectance profile sought.

Further, the multilayer photonic structures described herein have a base layer structure of the form $[0.5m_K L | m_K H | 0.5 m_K L]$ or $[0.5m_{KAVG} L | m_{KAVG} H | 0.5 m_{KAVG} L]$. In this embodiment, the multilayer photonic structures are generally arranged such that the first coating layer (i.e., the layer initially deposited on the substrate) and the last coating layer are low index coating layers, however this is not required. Accordingly, it should be understood that the number of low index coating layers in the multilayer photonic structure can be greater than the number of high index coating layers by one. For example, if the multilayer photonic structure has a total of nine coating layers, the multilayer photonic structure can have five low index coating layers and four high index coating layers.

Figure 7:
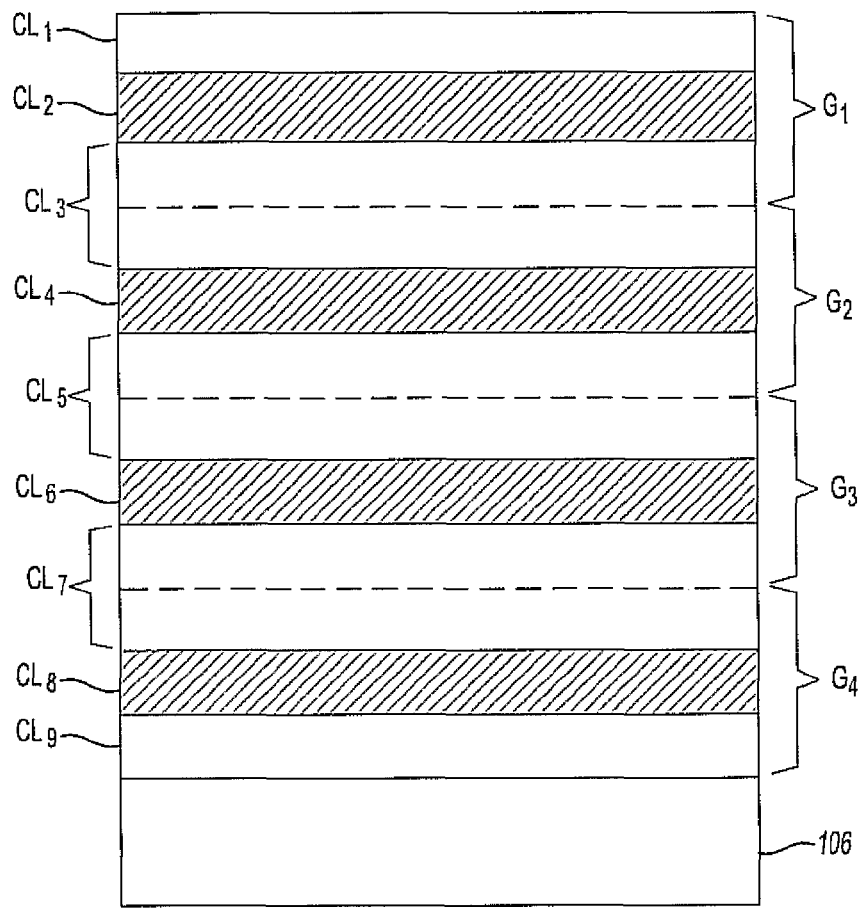
FIG. 7 depicts a multilayer stack with nine alternating coating layers of low index of refraction material and high index of refraction material according to an embodiment of the present invention.
Figure 8:
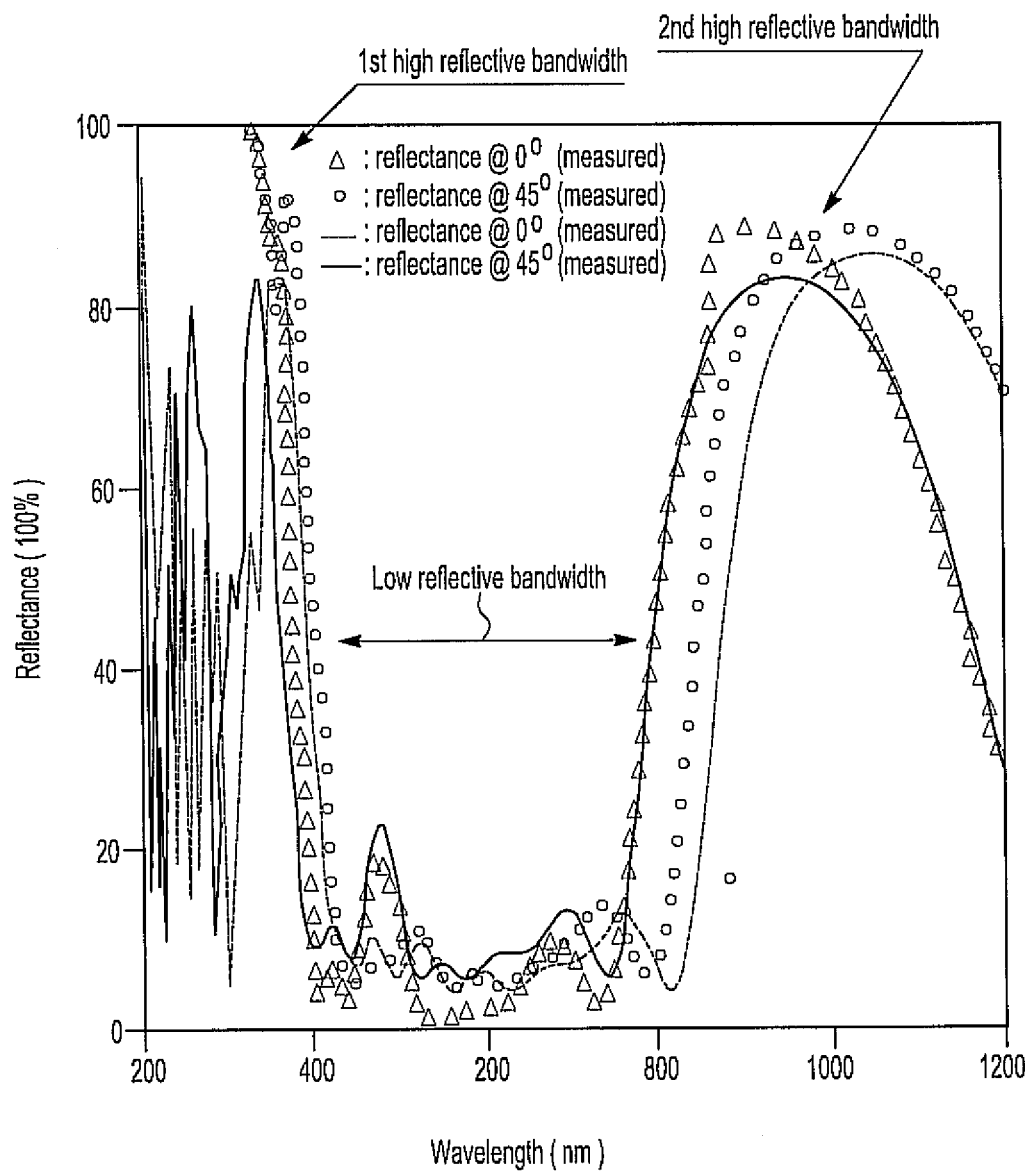
FIG. 8 graphically illustrates a calculated and a measured reflectance profile for the multilayer stack shown in FIG. 7.

Referring now to FIGS. 7 and 8, one embodiment of a multilayer photonic structure 400 is schematically illustrated. The multilayer photonic structure was designed to approximate a square well target reflectance profile similar to the profile shown in FIGS. 5 and 6. Accordingly, it should be understood that the target profile was a target reflectance profile. In this embodiment, the multilayer photonic structure 400 comprises a first high reflectivity bandwidth and a second high reflectivity bandwidth separated by a low reflectivity bandwidth, as is graphically illustrated in FIG. 8. In general, the reflectance of wavelengths of electromagnetic radiation in the first high reflectivity bandwidth and the second high reflectivity bandwidth is at least 50% for wavelengths of electromagnetic radiation which fall within each of the bandwidths. However, the reflectance is less than 50% for wavelengths of electromagnetic radiation which fall within the low reflectivity bandwidth.

In the embodiment of the multilayer photonic structure 400 shown in FIG. 7, the multilayer photonic structure 400 is based on a basic layer structure having the form $[0.5m_{KAVG} L | m_{KAVG} H | 0.5 m_{KAVG} L]$, as described above. The multilayer photonic structure was designed for a reference wavelength $\lambda_{ref}$ of 550 nm and deposited on a quartz glass substrate having an index of refraction of 1.52 with air being the incidence medium (i.e., $n_0$ is 1). The incident light is natural, white light with a degree of polarization of 0.5. The layers of high index material were formed from titania ($TiO_2$) while the layers of low index material were formed from silica ($SiO_2$). The index of refraction of titania, as deposited, was 2.29 while the index of refraction of silica, as deposited, was 1.46.

While the multilayer photonic structure 400 has been described herein as comprising titania and silica, it should be understood that other materials may be used to form the layers of high index and low index materials. For example, other dielectric materials with similar indices of refraction may be used. Alternatively, the dielectric materials used to form the coating may comprise one or more dopants which increase or decrease the index of refraction of the material such that the index of refraction of the material is as specified. Moreover, it should also be understood that materials with different indices of refraction may be used to achieve the target reflectance profile, in which case the thicknesses of the individual layers may be adjusted accordingly while still achieving the desired reflectance profile.

As noted herein, the embodiment of the multilayer photonic structure depicted in FIG. 7 was designed for a reference wavelength $\lambda_{ref}$ of 550 nm. As a result, the first high reflectivity bandwidth comprises wavelengths of electromagnetic radiation in the ultraviolet portion of the electromagnetic spectrum, the low reflectivity bandwidth comprises wavelengths of electromagnetic radiation in the visible portion of the electromagnetic spectrum, and the second high reflectivity bandwidth comprises wavelengths of electromagnetic radiation in the infrared portion of the electromagnetic spectrum, as illustrated in FIG. 8.

More specifically, the first high reflectivity bandwidth has a reflectance of 50% or greater for electromagnetic radiation with a wavelength less than about 400 nm while the second high reflectivity bandwidth has a reflectance of 80% or greater for electromagnetic radiation with wavelengths greater than about 800 nm. The low reflectivity bandwidth has as reflectance of 20% or less for wavelengths of electromagnetic radiation from about 400 nm to about 800 nm. Based on the foregoing reflectance values, the multilayer photonic structure 400 may be referred to as a UV-IR reflector.

While the embodiment of the multilayer photonic structure 400 shown in FIG. 7 is designed for a reference wavelength $\lambda_{ref}$ of 550 nm, it should be understood that the multilayer photonic structure 400 may be designed for other reference wavelengths and, as such, the first high reflectance bandwidth, the second high reflectance bandwidth and the low reflectance bandwidth may include different wavelengths of electromagnetic radiation. Further, the reflectance within each of the reflectivity bandwidths may be higher or lower depending on the specific target reflectance profile on which the multilayer photonic structure 400 is based.

Using the methodology described hereinabove it was determined that a total of four groups of layers (i.e., K=4) having the form [0.5m$_{KAVG}$L|m$_{KAVG}$H|0.5m$_{KAVG}$L] could be used to obtain the desired reflectance profile. The thickness multipliers for each group of layers as well as the thickness D$_L$ for each low index layer and the thickness D$_H$ for each high index layer of each group of layers G$_K$ are shown in Table 5. Once the thickness multiplier for each group G$_K$ of layers was determined the thicknesses D$_L$ and D$_H$ were calculated according to Equations (1) and (2). It should be noted that the thickness multiplier M$_{KAVG}$ for each group G$_K$ was determined for angles of incidence of 0°, 15°, 30°, and 45°, as described above. Accordingly, it should be understood that the multilayer photonic structure 400 behaves as an omnidirectional reflector for electromagnetic radiation in the first and second reflectivity bandwidths which have angles of incidence between 0° and 45° relative to the normal to the surface of the multilayer photonic structure.

TABLE 5

| Group (K) | m$_{KAVG}$ | D$_L$ (nm) | D$_H$ (nm) |
| --- | --- | --- | --- |
| 1 | 2.045 | 96.3018 | 122.7953 |
| 2 | 1.828 | 86.0835 | 109.7658 |
| 3 | 1.842 | 86.7521 | 110.6184 |
| 4 | 1.8304 | 86.19178 | 109.9039 |

In order to form the multilayer photonic structure 400 shown in FIG. 7, four groups of layers having the thicknesses specified in Table 5 were deposited on a quartz substrate 106 utilizing vacuum deposition techniques. As described above, to obtain a multilayer photonic structure having the desired properties, adjacent layers of similar materials may be deposited as a single coating layer. For example, in the embodiment of the multilayer photonic structure 400 shown in FIG. 7, adjacent layers of low index material (i.e., the top low index layer of one group and the bottom low index layer of the next subsequent group) were deposited as a single coating layer. FIG. 7 schematically illustrates both the group layer structure of the multilayer photonic structure as well as the coating layers CL actually deposited to achieve the multilayer photonic structure with the desired properties. To form a multilayer photonic structure comprising the groups of layers with the thicknesses indicated in Table 2, a total of nine coating layers CL were deposited on the substrate 106. The thicknesses and material of each coating layer CL are shown in Table 6.

TABLE 6

| Coating Layer (CL) | Thickness (nm) | Material Type |
| --- | --- | --- |
| 1 (first) | 96.3018 | low index |
| 2 | 122.7953 | high index |
| 3 | 182.3853 | low index |
| 4 | 109.7658 | high index |
| 5 | 172.8356 | low index |
| 6 | 110.6184 | high index |
| 7 | 172.9439 | low index |
| 8 | 109.9039 | high index |
| 9 (last) | 86.19178 | low index |

The measured and calculated reflectance profiles for the multilayer photonic structure of FIG. 7 are graphically illustrated for angles of incidence of 0 and 45 degrees in FIG. 8. The measured reflectance profiles were measured with a Varian Cary Bio 300 UV-Vis Spectrophotometer. The calculated reflectance profiles were determined according to the method described hereinabove to approximate a target reflectance profile having a square-well shape. FIG. 8 graphically demonstrates that the multilayer photonic structures produced according to the methods described herein have measured reflectance profiles which closely approximate the calculated reflectance profiles. For example, the multilayer photonic structure depicted in FIG. 7 and having coating layers with the thicknesses specified in Table 6 has a reflectance profile with a first high reflectivity bandwidth for wavelengths of electromagnetic radiation of less than about 400 nm, a low reflectivity bandwidth for wavelengths of electromagnetic radiation from about 400 nm to about 800 nm, and a second high reflectivity bandwidth for wavelengths of electromagnetic radiation greater than about 800 nm. Further, FIG. 8 also graphically illustrates that the reflectance of the multilayer photonic structure is approximately the same for electromagnetic radiation with angles of incidence from about 0 to 45 degrees with a slight shift in the reflectivity bandwidths occurring at higher angles of incidence.

Figure 9:
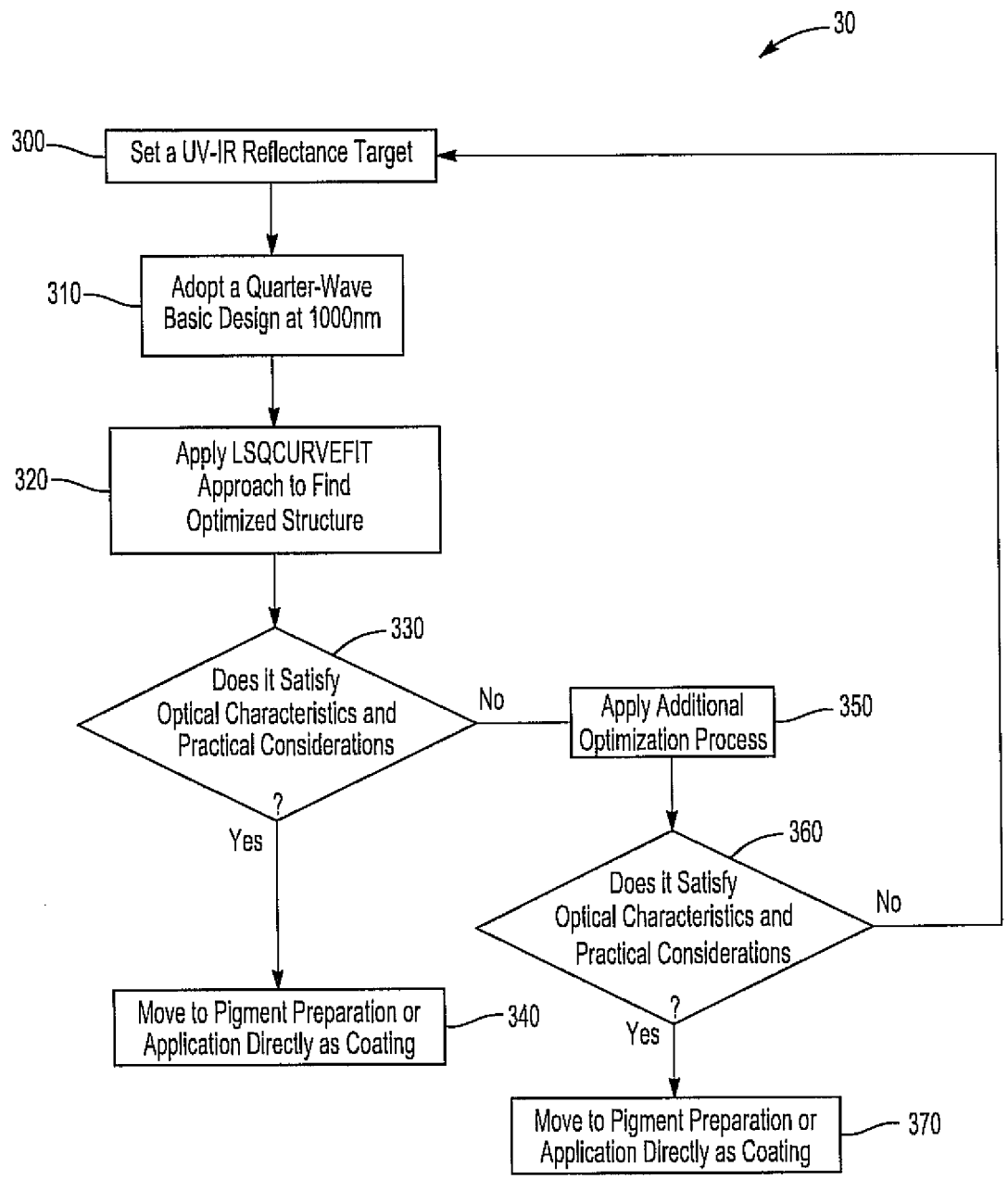
FIG. 9 illustrates a flow diagram for a process according to an embodiment of the present invention.

In another embodiment of the present invention, further improvements of a multilayer photonic structure can be afforded by using a process as illustrated in FIG. 9 at reference numeral 30. The process 30 includes setting a UV-IR reflectance target at step 300, and as described above, and adopting a quarter wave basic design at a predetermined wavelength as shown at step 310. For example and for illustrative purposes only, step 310 shows adopting a quarter wave basic design at 1000 nanometers. Thereafter, a LSQCURVEFIT approach can be used to find an optimized structure as shown at step 320. After the LSQCURVEFIT approach has determined an optimized structure, whether or not the structure satisfies optical characteristics and practical considerations can be determined at step 330. If optical characteristics and practical considerations have been satisfied, the process can then move forward to step 340 where preparation of a pigment or application directly as a coating can occur. In the alternative, if the optimized structure does not satisfy optical characteristics and practical considerations, additional optimization processing can occur at step 350. Once the additional optimization processing has been completed at step 350, whether or not the additionally optimized structure satisfies optical characteristics and practical considerations can be determined at step 360. If such characteristics and considerations have not been satisfied, the UV-IR reflectance target can be modified, that is set again, at step 300. In the alternative, if the optical characteristics and practical considerations have been satisfied at step 360, then the process can move towards pigment preparation or application directly as a coating at step 370.

At least one example resulting from the application of additional optimization processing at step 350 is shown in FIGS. 10 and 11 where the reflectance of an original nine-layer design is compared with three different ten-layer designs labeled 1, 2 and 3 obtained using additional optimization processing. As shown in FIG. 10, the additional optimization processing for the ten-layer designs affords for a broader range of IR wavelength reflectance when compared to the original nine-layer design. In addition, FIG. 11 provides a comparison of the reflectance for the original nine-layer design and multilayer photonic structures having four layers, eight layers, and eleven layers. As such, if, for example, 40 to 50 percent reflectance of IR radiation is determined to be acceptable, FIG. 11 shows that a four-layer or eight-layer multilayer photonic structure may be acceptable.

Figure 12:
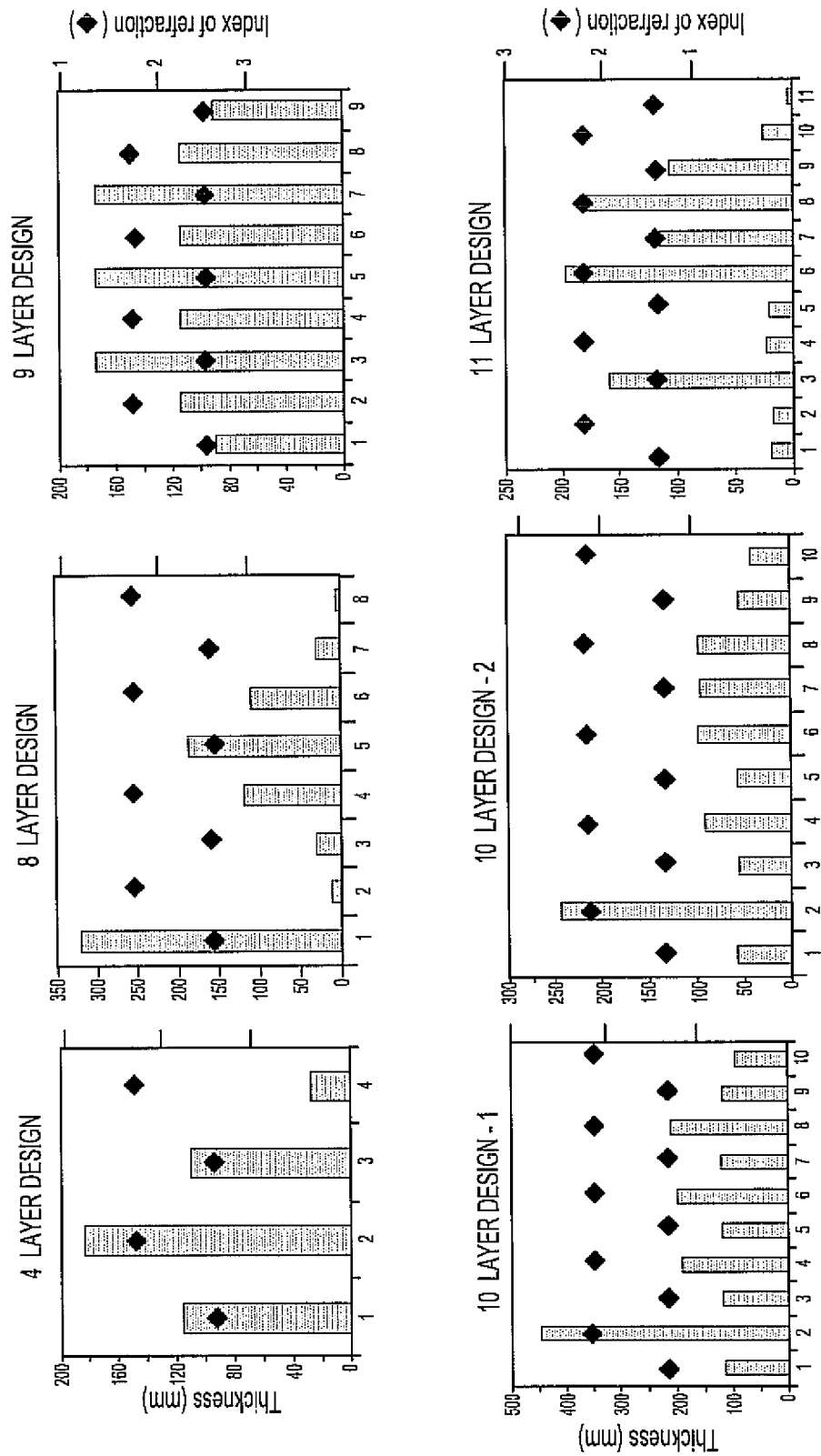
FIG. 12 graphically illustrates the thickness and index of refraction for multilayer photonic structures having four layers, eight layers, nine layers, ten layers, and eleven layers according to one or more embodiments of the present invention.

Turning now to FIG. 12, the thickness of the silica and titanium oxide layers for the four-layer design, eight-layer design, nine-layer original design, the ten-layer design 1, the ten-layer design 2, and the eleven-layer design are shown. In addition, the index of refraction for each layer is superimposed onto the plots. As such, FIG. 12 shows that non-periodic layered structures have been developed that can provide or be used for UV-IR reflectors.

In some instances, a multilayer stack according to an embodiment of the present invention can be designed and/or manufactured such that a non-periodic layered structure with a plurality of layers of high index of refraction material designated as H1, H2, H3 . . . Hn and a plurality of layers of low index of refraction material designated L1, L2, L3 . . . Lm is provided. The layers can have predefined thicknesses designated as $d_{H1}$, $d_{H2}$, $d_{H3}$ . . . $d_{Hn}$ and $d_{L1}$, $d_{L2}$, $d_{L3}$ . . . $d_{Lm}$, respectively. In addition, the thickness $d_{H1}$ can be generally not equal to at least one of the thicknesses $d_{H2}$, $d_{H3}$ or $d_{Hn}$ and the thickness $d_{L1}$ can be generally not equal to at least one of the thicknesses $d_{L2}$, $d_{L3}$ or $d_{Lm}$. In some instances, the thickness $d_{H1}$ is different than $d_{H2}$ and $d_{H3}$ and/or the thickness $d_{L1}$ is different than $d_{L2}$ and $d_{L3}$. In other instances, the thickness $d_{H1}$ is different than $d_{H2}$, $d_{H3}$ . . . and $d_{Hn}$, and/or the thickness $d_{L1}$ is different than $d_{L2}$, $d_{L3}$ . . . and $d_{Lm}$.

The thickness of each layer can be determined using a theory of equivalent layers developed during research of equivalent layer techniques, and not addressing omnidirectionality as in the instant invention. Such a theory states that optical properties of a single material can be replicated by a symmetrical combination of a three-layer structure having preset high and low refractive indices of refraction (see Alexander V. Tilchonravov, Michael K. Trubetskov, Tatiana V. Amotchkina, and Alfred Thelen, "Optical coating design algorithm based on the equivalent layers theory" Appl. Optics, 45, 7, 1530, 2006). For example, a three-layer two-material structure with indices of refraction equal to $n_1$ and $n_2$, and having physical thicknesses of $d_1$ and $d_2$ that is equivalent to a single layer of material having an index of refraction of N and a thickness of D is illustrated in FIG. 13. A characteristic matrix (M) can completely describe all of the structures optical properties and Herpin's theorem states that the equivalent single-layer structure can have the same optical properties as the three-layer structure if an equivalent matrix ($M_E$) can be achieved.

A solution for $M_E$ can result in a non-unique solution set which approximates the original structure. As such, expressions for M and $M_E$ shown in Equations 21 and 22 below can be used to establish criteria for the existence of an equivalent 3-layer structure in which each matrix element of the two matrices M and $M_E$ are equated to each other.

$$M = \begin{bmatrix} \cos2\varphi_1 * \cos2\varphi_2 - p*\sin2\varphi_1 * \sin2\varphi_2 & \frac{1}{n_1}(\sin2\varphi_1 * \cos2\varphi_2 + p*\cos2\varphi_1 * \sin2\varphi_2 + q*\sin2\varphi_2) \\ in_1(\sin2\varphi_1 * \cos2\varphi_2 + p*\cos2\varphi_1 * \sin2\varphi_2 - q*\sin2\varphi_2) & \cos2\varphi_1 * \cos2\varphi_2 - p*\sin2\varphi_1 * \sin2\varphi_2 \end{bmatrix} \quad (21)$$

where:

$$p = \frac{1}{2}\left(\frac{n_1}{n_2} + \frac{n_2}{n_1}\right), \quad q = \frac{1}{2}\left(\frac{n_1}{n_2} - \frac{n_2}{n_1}\right), \quad \varphi_1 = \frac{2\pi}{\lambda}(n_1 d_1), \quad (22)$$

-continued $$\varphi_2 = \frac{2\pi}{\lambda}(n_2 d_2), \quad \lambda = \text{reflected wavelength}$$

$$M_E = \begin{bmatrix} \cos\Phi & \frac{1}{N}\sin\Phi \\ iN\sin\Phi & \cos\Phi \end{bmatrix}$$

In so doing, the following expressions of the structural parameters of the two materials used for the 3-layer structure can be derived:

$$\cos\Phi = \cos2\varphi_1 \cos2\varphi_2 + p\sin2\varphi_1 \sin2\varphi_2 \quad (23)$$

$$N = n_1 \sqrt{\frac{\sin2\varphi_1 \cos2\varphi_2 + p\cos2\varphi_1 \sin2\varphi_2 - q\sin2\varphi_2}{\sin2\varphi_1 \cos2\varphi_2 + p\cos2\varphi_1 \sin2\varphi_2 + q\sin2\varphi_2}} \quad (24)$$

and original designs of ideal omnidirectional reflectors can be replicated with equivalent structures made from different starting materials.

An illustrative example of the use of the theory of equivalent layers to design and/or provide an omnidirectional structural color is discussed below. It is appreciated that the example provided is for an omnidirectional structural color, however the same methodology can be used to design and/or manufacture a UV-IR reflector.

EXAMPLE

Starting with a high index of refraction material with a refractive index of 2.89 and a low index of refraction material with a refractive index of 2.5, and using a quarter-wave thickness criterion, an expression, for the thickness of the high index of refraction material $d_H$ and the thickness of the low index of refraction material $d_L$, for a given target wavelength λ can be calculated from Equation 25 below:

$$d_H = \frac{\lambda}{4n_H}, \quad d_L = \frac{\lambda}{4n_L} \quad (25)$$

Using a target wavelength of 575 nanometers, the layer thickness for the high index of refraction material is approximately 49.7 nanometers and the layer thickness for the low index of refraction material is approximately 57.5 nanometers. A resultant reflectance versus wavelength of such a structure can be generated using a one-dimensional (1-D) photonic calculator written for MATLAB. This calculator uses a matrix method to calculate the reflectivity, transmission, and absorptions of 1-D optically stratified medium.

Figure 14:
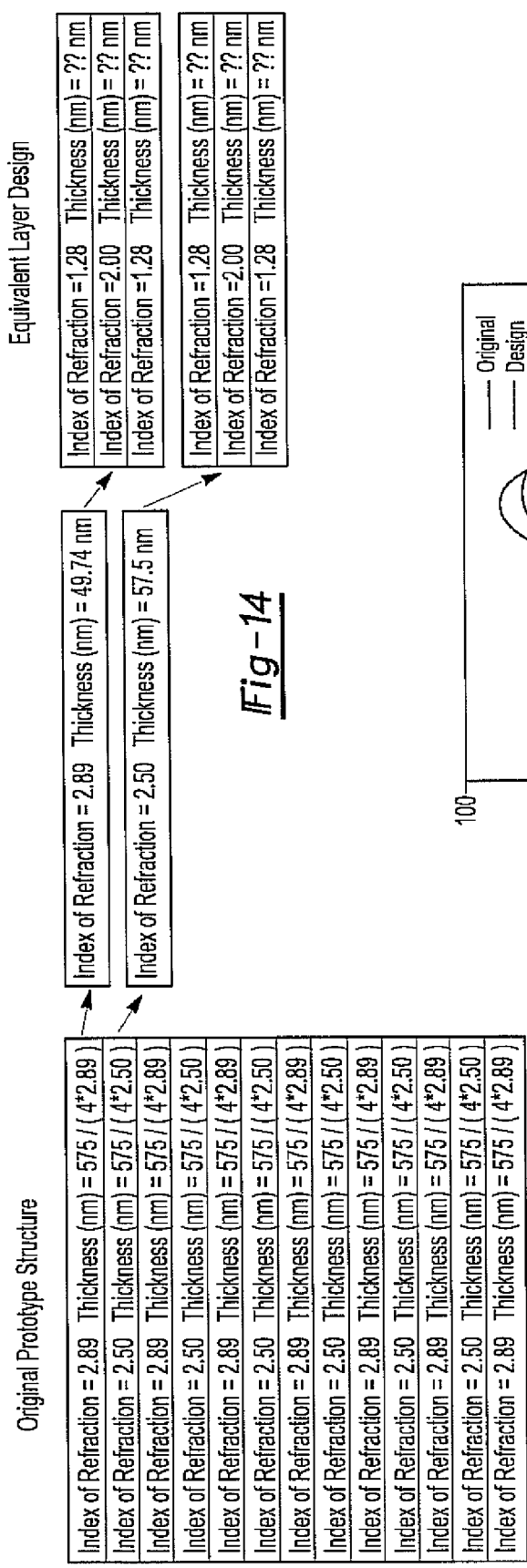
FIG. 14 illustrates an original prototype structure of an omnidirectional reflector and an equivalent layer design.

Regarding an equivalent design using different starting materials, a first material with a refractive index of 1.28 and a second material with a refractive index of 2.0 were assumed. In addition, an incident angle of 0 degrees for the illuminating electromagnetic radiation, natural light with 50% transverse electric and 50% transverse magnetic modes, a transfer medium of air and a substrate of glass were assumed. A schematic representation of the replacement of each original layer by three equivalent layers is shown in FIG. 14. As illustrated in this figure, the thicknesses of each equivalent layer used to replace each layer of the original prototype are values to be determined.

The simulation process is initiated with input of the indices of refraction for the high index of refraction material and the low index of refraction material of the original prototype. In addition, thicknesses of the two materials can be included and the 1-D photonic calculator can generate a reflectance versus wavelength plot.

Figure 15:
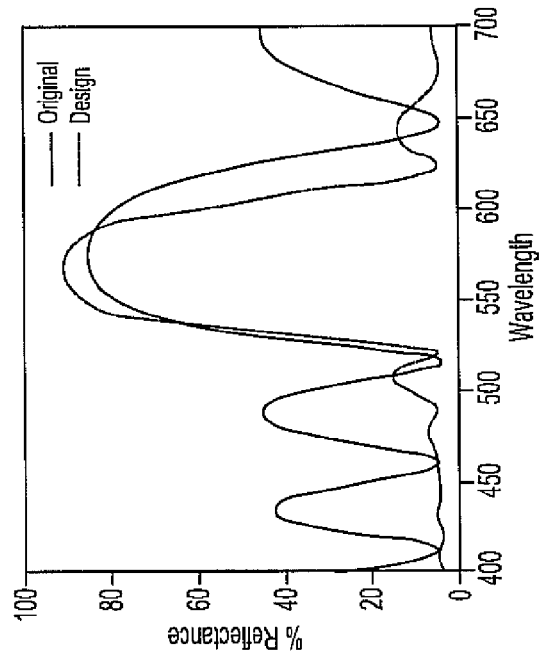
FIG. 15 is a graphical representation of reflectance versus wavelength for a 39-layer equivalent structure made from a first material and a second material replacing a 13-layer structure made from a low index of refraction material with a refractive index of 2.5 and a high index of refraction material with a refractive index of 2.89.

With regard to providing three equivalent layers to match the optical properties of each single layer, optimization consists of varying the thicknesses of the individual equivalent layers—assuming the first layer and the third layer are equal—and comparing the resultant wavelength versus reflectance curve to the original reference. An example of a simulation for replacing each layer of an original 13-layer stack with three equivalent layers is shown in FIG. 15 where an entire 13-layer original reference structure as illustrated in FIG. 14 was replicated with three equivalent layers replacing each of the original layers. Therefore, a simulation for 13×3=39 layers was chosen as a starting structure with the thicknesses of the first material ($n_1$=1.28) and the second material ($n_2$=2.0) were varied from 1 to 500 nanometers. FIG. 15 illustrates that optimization of the equivalent 39-layer structure with a first material thickness of 99 nanometers and a second material thickness of 14 nanometers provided similar results for reflectance as a function of wavelength when compared to the original 13-layer structure. The equivalent 39-layer structure also resulted in a drastic reduction in the side bands that are present for the original 13-layer structure. As such, an original two-material 13-layer structure having a high index of refraction material with a refractive index of 2.89 and a low index of refraction material with a refractive index of 2.5 is shown to be replaceable with a two-material 39-layer structure having a high index of refraction material with a refractive index of 2.0 and a low index of refraction material with a refractive index of 1.28.

In an effort to provide additional flexibility with respect to materials selection and manufacturing techniques, the concept of uncoupling the layers during optimization calculations of the layer thicknesses is introduced. As such, the previous concept of replacing the layers of the original 13-layer stack with repeating equivalent 3-layer stacks is discarded and each layer has its own multiplier that determines the final thickness thereof. For example, a 39-layer structure can have 39 separate multiplier variables, and thus 39 layers, each having a different thickness.

FIG. 16 illustrates a 39-layer structure where two materials are used, with one of the materials having a high index of refraction ($N_{high}$) and one of the materials having a low index of refraction ($N_{low}$). As shown in this figure, the thickness of each of these layers is equal to a multiplier ($Mult_i$) times a reference wavelength divided by the respective index of refraction and either 4 or 8. In addition, the alternating layers of high index of refraction material are designated H1, H2, H3 . . . Hn and the alternating layers of low index of refraction material designated L1, L2, L3 . . . Lm. Furthermore, the layers each can have a thickness designated as $d_{H1}$, $d_{H2}$, $d_{H3}$ . . . $d_{Hn}$ and $d_{L1}$, $d_{L2}$, $d_{L3}$ . . . $d_{Lm}$ as shown in the figure. It is appreciated that it is not necessary to perform a one-quarter or one-eighth multiplier; however, in this example such a multiplier was included simply because of experience with previous experiments and/or calculations.

Turning now to Table 7 below, a list of multiplier values determined for a 39-layer structure and solved using a LSQCURVEFIT module within an optimization Toolbox™ from MATLAB is shown.

TABLE 7

"High" - Odd layer thicknesses (nm) = $Mult_i$ * 550/(8 * N) = $d_{Hi}$
"Low" - Even layer thicknesses (nm) = $Mult_j$ * 550/(4 * N) = $d_{Lj}$
(Multiplier List) Multiplier values

| (M1) | (M2) | (M3) | (M4) | (M5) | (M6) | (M7) |
|---|---|---|---|---|---|---|
| 0.0435 | 1.2139 | 0.1307 | 0.8384 | 2.2490 | 1.2396 | 1.7736 |
| (M8) | (M9) | (M10) | (M11) | (M12) | (M13) | (M14) |
| 1.1475 | 2.2261 | 0.0101 | 0.0122 | 1.0889 | 2.0830 | 1.1047 |
| (M15) | (M16) | (M17) | (M18) | (M19) | (M20) | (M21) |
| 2.2077 | 1.0959 | 0.0100 | 0.0101 | 2.0387 | 1.1277 | 2.0575 |
| (M22) | (M23) | (M24) | (M25) | (M26) | (M27) | (M28) |
| 1.4407 | 0.6883 | 1.8276 | 1.0380 | 0.5775 | 0.7862 | 0.6875 |
| (M29) | (M30) | (M31) | (M32) | (M33) | (M34) | (M35) |
| 0.7576 | 0.9844 | 0.3575 | 1.0429 | 0.5748 | 0.6599 | 0.9185 |
| (M36) | (M37) | (M38) | (M39) | | | |
| 0.7343 | 0.5068 | 0.876 | 0.3094 | | | |

Using the multipliers in Table 7 and incident angles of 0, 15, 30 and 45 degrees, calculations of the reflectance were performed in order to determine if a change in color, i.e. shift in band reflection, would occur at different angles. Desirably, the mean wavelength does not change with increasing angle and thus a truly omnidirectional color results. As shown in FIG. 17, with increasing incident angle, the calculations showed a continual "blue shift" of the mean reflected wavelength. However, this shift was less than 75 nanometers and thus a non-periodic layered structure exhibiting omnidirectional structural color is provided.

In order to develop a broad evaluation of possible materials that can be used for making an omnidirectional reflector, calculations were performed for materials having refractive indices ranging from 1.4 to 2.3 for the "high" index materials and 1.2 to 2.1 for the "low" index materials. Optimization parameters were defined as the absolute value of the difference in maximum wavelengths (ΔX) between an original prototype and an equivalent layer design, and the absolute value of the difference in maximum reflectance (ΔY) between the original prototype and the equivalent layer design. Examples of ΔX and ΔY are shown in FIG. 18 and it is appreciated that the X and Y coordinates for the maximum reflectance for the original prototype structure and the equivalent layer design were chosen to calculate ΔX and ΔY. In addition, in order to visually illustrate ΔX and ΔY as a function of refractive index pairs, plots such as FIGS. 19-22 were developed and discussed below.

Figure 19:
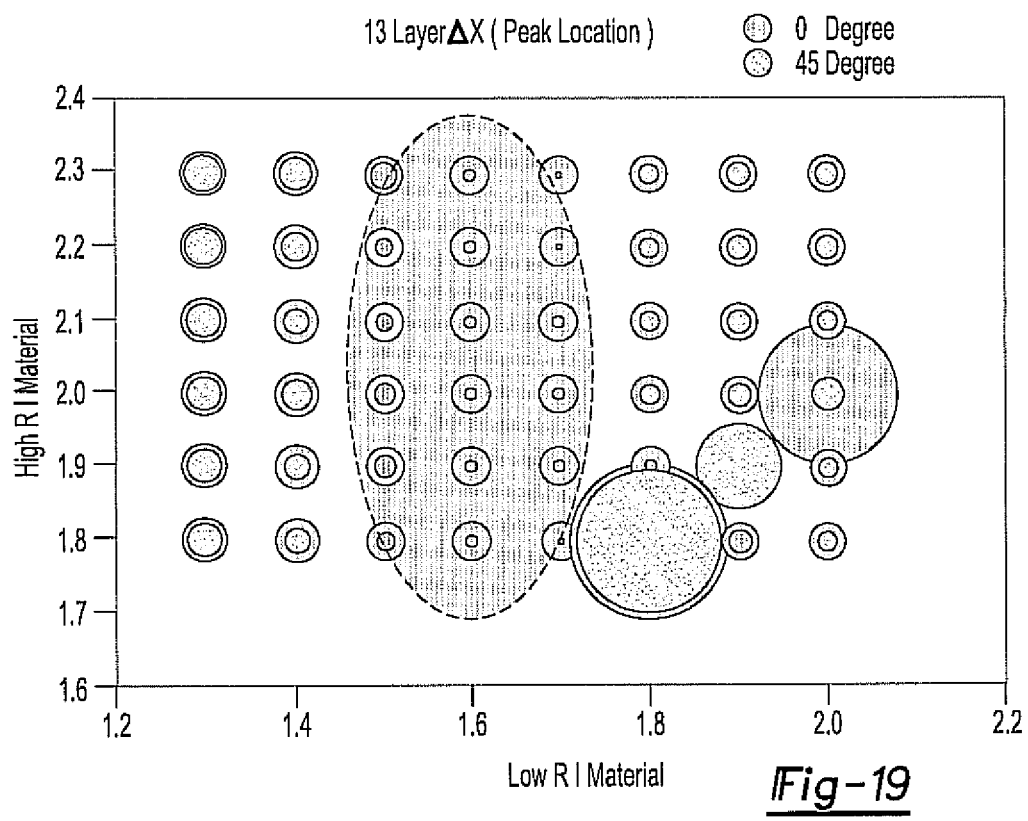
FIG. 19 is a plot of $\Delta X$ between a 13-layer periodic structure and an equivalent 13-layer non-periodic structure for 0 and 45 degree incident angles as a function of refraction index values for a low refraction index material and a high refractive index material.
Figure 20:
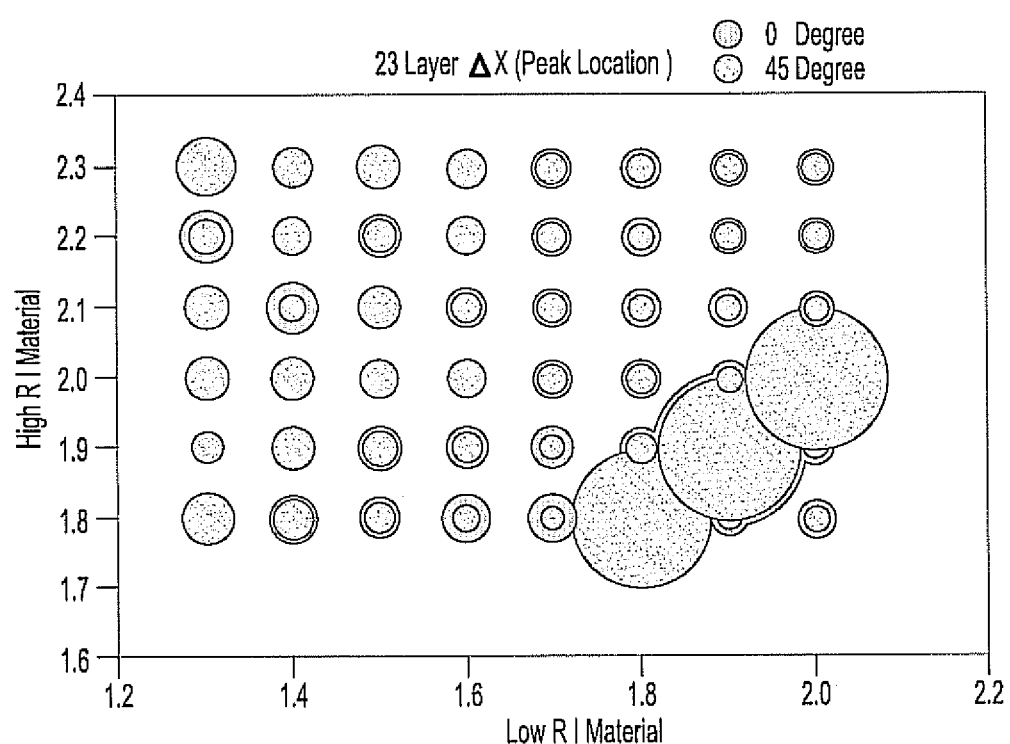
FIG. 20 is a plot of $\Delta X$ between a 23-layer periodic structure and an equivalent 23-layer non-periodic structure for 0 and 45 degree incident angles as a function of refraction index values for a low refraction index material and a high refraction index material.

FIG. 19 illustrates the difference in ΔX between an original 13-layer prototype and an equivalent 13-layer non-periodic design at 0 and 45 degree angles of incidence with the diameters of the shaded circles shown on the graph proportional to ΔX between the original prototype and the equivalent layer design. The larger the shaded circle, the greater the value of ΔX, and thus the greater the shift in the maximum wavelength between the original 13-layer prototype and the equivalent non-periodic layer design made from two materials having that lower refractive indices. In this manner, refractive index pairs can be easily identified in which there is a small difference in the maximum wavelengths between the original 13-layer prototype and the equivalent non-periodic layer design. Similarly, FIG. 20 illustrates ΔX between an original 23-layer prototype and an equivalent 23-layer non-periodic design at 0 and 45 degree angles of incidence.

Figure 21:
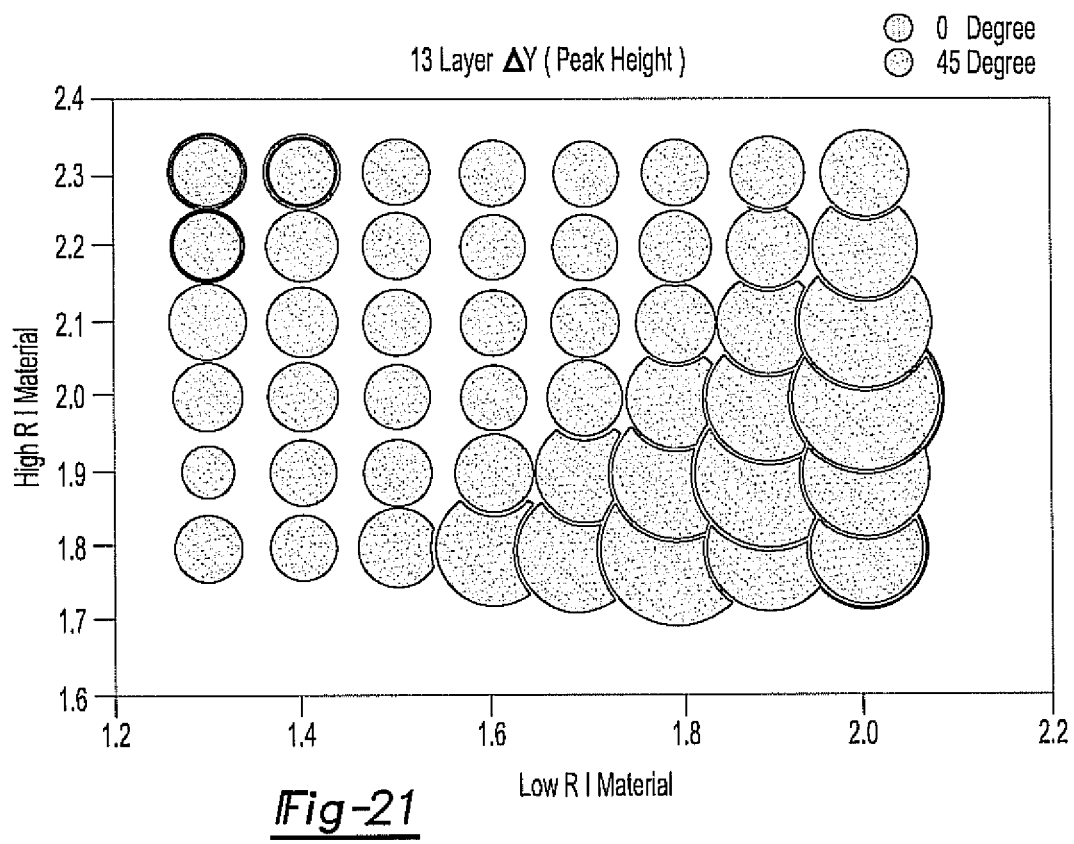
FIG. 21 is a plot of $\Delta Y$ between a 13-layer periodic structure and an equivalent 13-layer non-periodic structure for 0 and 45 degree incident angles as a function of refraction index values for a low refraction index material and a high refraction index material.
Figure 22:
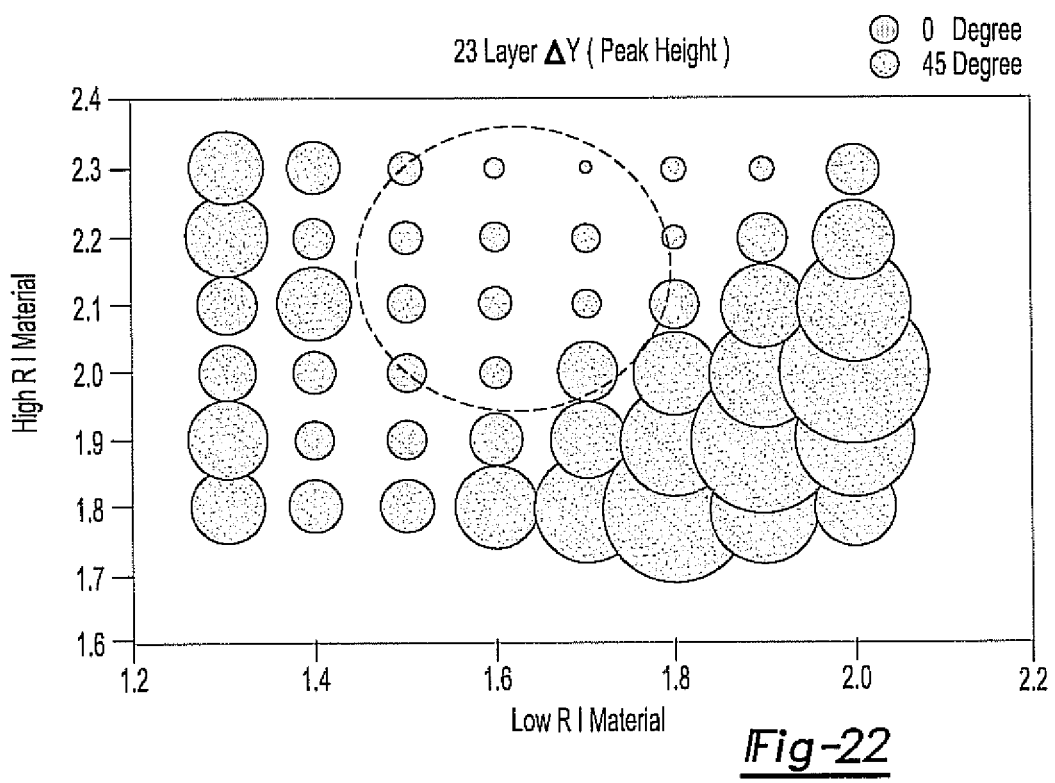
FIG. 22 is a plot of $\Delta Y$ between a 23-layer periodic structure and an equivalent 23-layer non-periodic structure for 0 and 45 degree incident angles as a function of refraction index values for a low refraction index material and a high refraction index material.

Turning now to FIGS. 21 and 22, ΔY between the 13-layer and 23-layer original prototypes and equivalent 13-layer and 23-layer non-periodic layer designs, respectively, are shown as a function of refractive index pairs for 0 and 45 degree incidence angles. As with FIGS. 19 and 20, review of FIGS. 21 and 22 allow easy identification of refractive index pairs in which there is a small difference in ΔX and ΔY between original multi-layer prototypes and equivalent non-periodic multi-layer designs. For example, review of FIGS. 19-22 illustrates that a first material with a refractive index in the range of 1.5 to 1.7 and a second material with a refractive index in the range of 2.0 to 2.3 could be suitable for making a non-periodic multilayer stack that exhibits omnidirectional structural color with a color/reflectance band centered about 575 nanometers.

It is appreciated that altering or selecting a different target reflection band (e.g. a different color) can change the actual trends shown in FIGS. 19-22. However, trends will still exist and thus identification of suitable refractive index pairs is provided.

Figure 23:
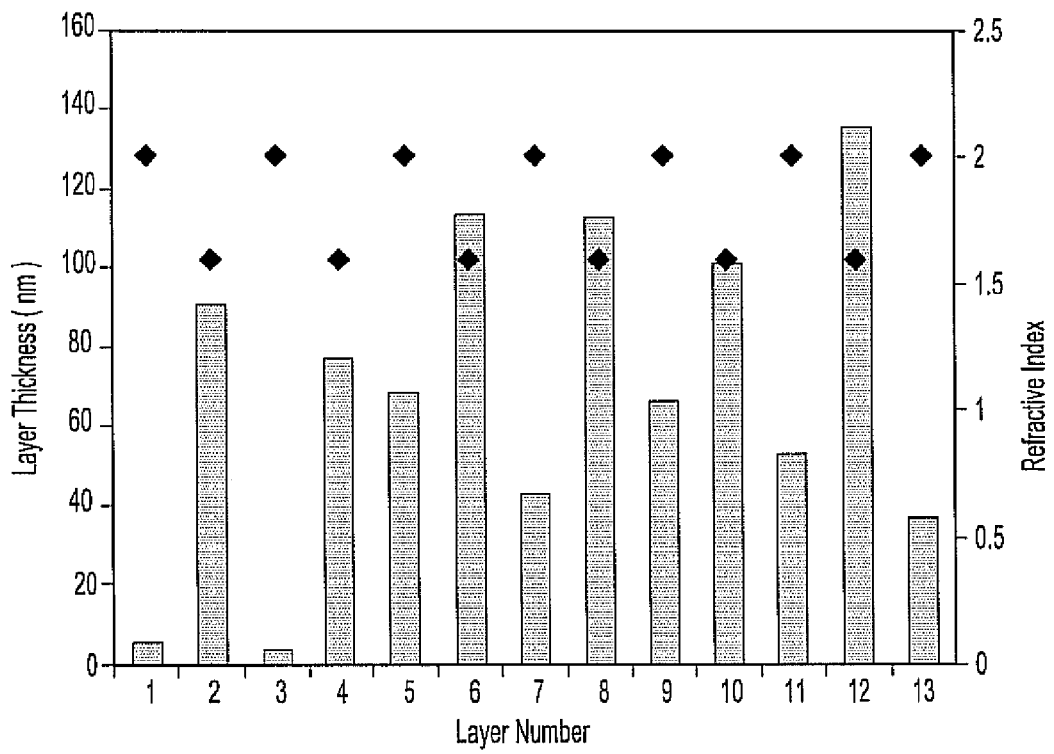
FIG. 23 is a plot of layer thickness and refractive indices for layers of a 13-layer non-periodic structure according to an embodiment of the present invention.
Figure 24:
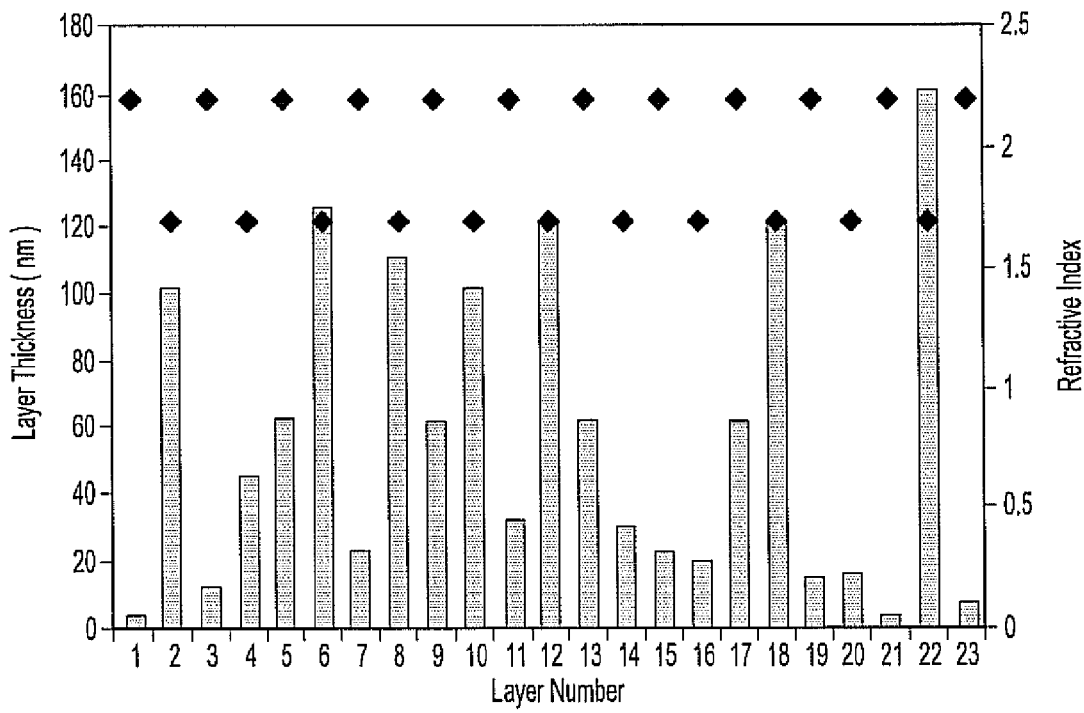
FIG. 24 is a plot of layer thickness and refractive indices for layers of a 23-layer non-periodic structure according to an embodiment of the present invention.

Illustrating actual design thicknesses for a non-periodic omnidirectional structural color, FIG. 23 shows a schematic thickness plot for a 13-layer non-periodic multilayer made from a first material having a refractive index of 2.0 and a second material having a refractive index of 1.6 are shown in FIG. 23. The thicknesses of the various layers are shown by the elongated rectangles which correspond to the left y-axis and the refractive index of each layer is shown by the solid diagonals which correspond to the right y-axis. Similarly, the layer thicknesses for a 23-layer non-periodic omnidirectional structural color made using a first material with a refractive index of 2.2 and a second material with a refractive index of 1.7 are shown in FIG. 24.

In a similar manner, an omnidirectional UV-IR reflector can be designed and manufactured using a greater range of materials than previously available. Such materials include metals, semiconductors, ceramics, polymers, and combinations thereof. It is appreciated that the opportunity to use a greater range of materials further affords for a greater range of manufacturing techniques to make desired multilayer stacks/structures.

In addition to the above, multilayer structures using more than two materials can be used to provide a UV-IR reflector according to an embodiment of the present invention. For example, a multilayer stack made from three or more different materials can provide a UV-IR reflector when designed according to the teachings herein. In such an example, the omnidirectional UV-IR reflector includes a multilayer stack having at least three layers, the at least three layers having at least one first index of refraction material A1 and at least one second index of refraction layer B1. The at least one first index of refraction material layer and the at least one second index of refraction material layer can be alternately stacked on top of each other to provide the at least three layers. In addition, the at least one first index of refraction material layer and the at least one second index of refraction material layer each have a predefined thickness of $d_{A1}$ and $d_{B1}$, respectively, with the thickness $d_{A1}$ not being generally equal to the $d_{B1}$ thickness such that the multilayer stack has a non-periodic layered structure.

The multilayer stack, at incident angles between 0 to 45 degrees, has a first omnidirectional reflection band for electromagnetic radiation having a wavelength of less than 400 nanometers, a second omnidirectional reflection band for electromagnetic radiation having a wavelength of greater than 800 nanometers, and an omnidirectional transparency band between the first omnidirectional reflection band and the second omnidirectional reflection band. The multilayer stack can also have a transparency of at least 20% for a wavelength of about 850 nanometers for incident angles between 0 to 45 degrees.

The first omnidirectional reflection band and the second omnidirectional reflection band can reflect at least 50% of electromagnetic radiation having a wavelength of less than 400 nanometers and at least 50% of electromagnetic radiation having a wavelength of greater than 800 nanometers. In some instances, the first and second omnidirectional reflection bands reflect at least 75% of the electromagnetic radiation having a wavelength of less than about 400 nanometers and at least 75% of the electromagnetic radiation having a wavelength of greater than 800 nanometers, respectively.

The omnidirectional transparency band can be greater than 80% transparent, and in some instances greater than 90% transparent, for electromagnetic radiation having a wavelength between 400 to 800 nanometers. The multilayer stack can also reflect greater than 50%, and in some instances greater than 75%, of IR electromagnetic radiation having wavelengths between 800 and 1400 nanometers.

In some instances, the multilayer stack can include at least one third index of refraction material layer C1 with the at least one first index of refraction material layer A1, the at least one second index of refraction layer B1, and the at least one third index of refraction material layer C1 alternately stacked on top of each other such that the multilayer stack has the at least three layers and is a non-periodic layered structure.

The multilayer photonic structures described herein may be applied to an article of manufacture, such as the body panels of a vehicle, windows, lenses and the like, such that the reflective properties of the multilayer photonic structure are imparted to the article of manufacture. For example, in the case of windows, such as windows utilized in vehicles and/or buildings, the multilayer photonic structure may be directly formed on the glass or plastic which comprises the window thereby imparting the reflective properties of the multilayer photonic structure to the window.

Alternatively, the multilayer photonic structure may be incorporated into a paint or similar coating which is subsequently applied to an article of manufacture, such as a vehicle or building. For example, the multilayer photonic structure may be formed or rendered into flakes or discrete particles and incorporated into a liquid carrier, such as an organic or inorganic binder, and utilized in a paint or similar coating system which may be applied to an article of manufacture thereby imparting the reflective properties of the multilayer photonic structure to the article of manufacture. For example, the multilayer photonic structures described herein may first be deposited onto a carrier substrate using the techniques described hereinabove. Thereafter, the multilayer photonic structure is broken up into discrete particles or flakes. In one embodiment, the deposited multilayer photonic structure may first be separated from the substrate before being broken up into discrete particles. For example, the substrate may be peeled from the multilayer photonic structure, such as when the carrier substrate is a flexible, polymeric substrate, flexible alloy, or the like. Alternatively, the carrier substrate may be dissolved in a suitable solution thereby leaving behind the multilayer photonic structure. The multilayer photonic structure may also be peeled from the substrate. In another embodiment, the multilayer photonic structure and substrate are both broken up into discrete particles without separating the multilayer photonic structure from the substrate.

The multilayer photonic structure may be reduced to flakes or discrete particles using various known techniques. For example, the multilayer photonic structure may be milled or tumbled with milling media to crush the multilayer photonic structure and reduce the particle size of any resulting flakes. In one embodiment, a pigment is mixed with the multilayer photonic structure as the multilayer photonic structure is reduced to discrete particles. The flakes or discrete particles of the multilayer photonic structure may have an average thickness from about 0.5 microns to about 10 microns and an average diameter from about 10 microns to about 50 microns. The average thickness, as used herein, means the average value taken from at least three different thickness measurements and the term average diameter is defined as the average value taken from at least three different diameter measurements.

After the multilayer photonic structure has been reduced to flakes, the multilayer photonic structure may be incorporated into a paint or coating system. For example, the multilayer photonic structure (with or without a pigment) may be dispersed in a polymer matrix such that the discrete particles of the multilayer photonic structure are randomly oriented in the matrix. Thereafter, the paint or coating comprising the discrete particles of the multilayer photonic structure may be deposited on an article of manufacture by spraying, electrostatic charging, powder coating, and the like. The deposited coating may thereby impart the reflective properties of the multilayer photonic structure to the substrate to which it is applied.

In summary, the omnidirectional UV-IR reflector can be in the form of a multilayer film or flakes obtained films that have been subjected to crushing and/or grinding that can be applied as coating by mixing the flakes with pigments, a binder, a basecoat, a clearcoat and the like.

It should now be understood that the multilayer photonic structures described herein comprise a first high reflectivity bandwidth and a second high reflectivity bandwidth separated by a low reflectivity bandwidth. In particular embodiments the multilayer photonic structures are operable to reflect wavelengths of electromagnetic radiation in the UV and IR portions of the electromagnetic spectrum while transmitting electromagnetic radiation with wavelengths of light in the visible portion of the electromagnetic spectrum. Moreover, the multilayer photonic structures described herein exhibit omnidirectional reflectivity for wavelengths of electromagnetic radiation within the first and second high reflectivity bandwidths which are incident on the multilayer photonic structure for angles of incidence from about 0° to about 45° relative to a normal to the surface of the multilayer photonic structure. Further, the multilayer photonic structures may be applied to various articles of manufacture thereby imparting the reflective properties of the multilayer photonic structure to the specific article of manufacture.

The invention is not restricted to the illustrative examples described above. The examples are not intended as limitations on the scope of the invention. Methods, apparatus, compositions, and the like described herein are exemplary and not intended as limitations on the scope of the invention. Changes herein and other uses will occur to those skilled in the art. The scope of the invention is defined by the scope of the claims.

We claim:

1. An omnidirectional UV-IR reflector comprising:
a multilayer stack having an average thickness between 0.5 and 10 microns and between four and thirteen layers, said between four and thirteen layers having at least two first index of refraction material layers H1 and H2, and at least two second index of refraction material layers L1 and L2, said at least two first index of refraction material layers and said at least two second index of refraction material layers alternately stacked on top of each other such that said H1 layer is located between said L1 layer and said L2 layer, and said L2 layer is located between said H1 layer and said H2 layer;
said between four and thirteen layers each having a predefined thickness of $d_{H1}$, $d_{H2}$, $d_{L1}$, $d_{L2}$ with said $d_{H1}$ thickness not generally equal to said $d_{H2}$ thickness and said $d_{L1}$ thickness not generally equal to said du thickness; and
wherein said multilayer stack when shined by light at incident angles between 0 to 45 degrees, has a first high reflectivity bandwidth with more than 50% reflectance of electromagnetic radiation having wavelengths less than about 400 nanometers, a second high reflectivity bandwidth with more than 80% reflectance of electromagnetic radiation having wavelengths greater than about 800 nanometers, and a low reflectivity bandwidth with less than 20% reflectance of electromagnetic radiation having wavelengths between about 400 nanometers to 800 nanometers.

2. The omnidirectional UV-IR reflector of claim 1, wherein said first high reflectivity bandwidth has at least 75% reflectance of said electromagnetic radiation having a wavelength of less than about 400 nanometers.

3. The omnidirectional UV-IR reflector of claim 2, wherein said low reflectivity bandwidth has is greater than 80% transparency for electromagnetic radiation having a wavelength between about 400 to 800 nanometers.

4. The omnidirectional UV-IR reflector of claim 3, wherein said low reflectivity bandwidth has is greater than 90% transparency for electromagnetic radiation having a wavelength between about 400 to 800 nanometers.

5. The omnidirectional UV-IR reflector of claim 1, wherein said multilayer stack reflects greater than 80% of electromagnetic radiation having wavelengths between about 800 and 1400 nanometers.

6. A process for omnidirectionally reflecting UV and IR electromagnetic radiation, the process comprising:
providing a multilayer stack having an average thickness between 0.5 and 10 microns and between four and thirteen layers, the between four and thirteen layers having at least two first index of refraction material layers H1 and H2, and at least two second index of refraction layers L1 and L2, the at least two first index of refraction material layers and the at least two second index of refraction material layers alternately stacked on top of each other such that the H1 layer is located between said L1 layer and said L2 layer, and said L2 layer is located between said H1 layer and said H2 layer;
the between four and thirteen layers each having a predefined thickness of $d_{H1}$, $d_{H1}$, $d_{L1}$, $d_{L2}$ with the $d_{H1}$ thickness not generally equal to the $d_{H2}$ thickness and the $d_{L1}$ thickness not generally equal to the $d_{L2}$;
wherein the multilayer stack when shined by white light at incident angles between 0 to 45 degrees, has a first high reflectivity bandwidth with more than 50% reflectance of electromagnetic radiation having a wavelength of less than about 400 nanometers, a second high reflectivity bandwidth with more than 80% reflectance of electromagnetic radiation having a wavelength of greater than about 800 nanometers, and a low reflectivity bandwidth with less than 20% reflectance of electromagnetic radiation having wavelengths between about 400 nanometers to 800 nanometers;
providing a source of white light;
exposing the multilayer stack to the source of white light; and
the multilayer stack reflecting at least:
50% of electromagnetic radiation from the source of white light having wavelengths less than about 400 nanometers, at least 80% of electromagnetic radiation from the source of white light having wavelengths greater than about 800 nanometers and less than 20% of electromagnetic radiation from the source of white light having wavelengths between about 400 nanometers to 800 nanometers.

7. The process of claim 6, further including reflecting at least 75% of the electromagnetic radiation from the source of white light having wavelengths less than about 400 nanometers.

8. The process of claim 6, wherein the multilayer stack is transparent to at least 80% of the electromagnetic radiation from the source of white light having a wavelength between about 400 to 800 nanometers.

9. The process of claim 6, further including reflecting greater than 80% of electromagnetic radiation from the source of white light having wavelengths between about 800 and 1400 nanometers.

\* \* \* \* \*